US012488757B2

(12) United States Patent
Kim

(10) Patent No.: US 12,488,757 B2
(45) Date of Patent: Dec. 2, 2025

(54) DISPLAY DEVICE

(71) Applicant: Samsung Display Co., Ltd., Yongin-Si (KR)

(72) Inventor: Hong Kyu Kim, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/239,128

(22) Filed: Aug. 29, 2023

(65) Prior Publication Data

US 2024/0161702 A1 May 16, 2024

(30) Foreign Application Priority Data

Nov. 14, 2022 (KR) ........................ 10-2022-0152041

(51) Int. Cl.
*G09G 3/3266* (2016.01)
*G09G 3/3291* (2016.01)

(52) U.S. Cl.
CPC ......... *G09G 3/3266* (2013.01); *G09G 3/3291* (2013.01); *G09G 2310/0286* (2013.01); *G09G 2310/061* (2013.01); *G09G 2310/08* (2013.01); *G09G 2320/0247* (2013.01)

(58) Field of Classification Search
None
See application file for complete search history.

(56) References Cited

U.S. PATENT DOCUMENTS

| | | | | |
|---|---|---|---|---|
| 2005/0078100 A1* | 4/2005 | Tsujino | G09G 3/20 | 345/204 |
| 2010/0201666 A1* | 8/2010 | Tobita | G09G 3/3677 | 377/79 |
| 2011/0228893 A1* | 9/2011 | Tobita | G11C 19/28 | 377/77 |
| 2020/0035163 A1* | 1/2020 | Sun | G09G 3/3266 | |
| 2020/0193912 A1 | 6/2020 | Park et al. | | |
| 2021/0201804 A1* | 7/2021 | Feng | G09G 3/3266 | |
| 2022/0068194 A1 | 3/2022 | Kim et al. | | |

* cited by examiner

*Primary Examiner* — Matthew Yeung
(74) *Attorney, Agent, or Firm* — Innovation Counsel LLP

(57) ABSTRACT

Provided herein may be a display device including: a display panel first scan lines, second scan lines, and pixels electrically connected to the first and second scan lines; a first scan driving circuit including a plurality of first shift registers each of which is configured to output a first scan signal to a corresponding first scan line and is configured to be reset by a first reset signal; a second scan driving circuit including a plurality of second shift registers each of which is configured to output a second scan signal to a corresponding second scan line and is configured to be reset by a second reset signal; and a timing controller configured to respectively output the first reset signal and the second reset signal through different signal lines. The display device may be improved in visibility so that images can be displayed at various refresh rates.

19 Claims, 17 Drawing Sheets

DISPLAY DEVICE

CROSS-REFERENCE TO RELATED APPLICATION

The present application claims priority to Korean patent application number 10-2022-0152041 filed on Nov. 14, 2022, the entire disclosure of which is incorporated herein in its entirety by reference.

BACKGROUND

1. Field Inventive Concept

Various embodiments of the present disclosure relate to a display device.

2. Description of Related Art

With the development of information technology, the importance of a display device, which is a connection medium between a user and information, has been emphasized. Owing to the importance of display devices, the use of various kinds of display devices such as a liquid crystal display device and an organic light-emitting display device has increased.

Such display devices may display images of various contents. For example, the display devices may display various types of images such as still images, web pages, and images for movies or electronic games. In the case where a still image is display on a display device, frequent frame transitions are not required. On the other hand, in the case where images for movies or electronic games are displayed on a display device, frequent frame transitions are needed.

In terms of improvement in power consumption, technology of displaying images on the display device at various refresh rates (or refresh frame rates) have been developed.

SUMMARY

Various embodiments of the present disclosure are directed to a display device which is improved in visibility so that images can be displayed at various refresh rates.

An embodiment of the present disclosure may provide a display device including: a display panel including a plurality of first scan lines, a plurality of second scan lines, and a plurality of pixels electrically connected to the plurality of first scan lines and the plurality of second scan lines; a first scan driving circuit including a plurality of first shift registers each of which is configured to output a first scan signal to a corresponding first scan line and is configured to be reset by a first reset signal; a second scan driving circuit including a plurality of second shift registers each of which is configured to output a second scan signal to a corresponding second scan line and is configured to be reset by a second reset signal; and a timing controller configured to respectively output the first reset signal and the second reset signal through different signal lines.

The display device may further including a plurality of data lines disposed on the display panel and receiving a plurality of data voltages and a data driving circuit configured to supply the plurality of data voltages to the plurality of data lines. The plurality of pixels may be electrically connected to the plurality of data lines. The plurality of data voltages may be configured to be written to the plurality of pixels in an active period of one frame period. In the active period, the each of the plurality of first shift registers may output a first scan signal having a turn-on voltage level to the corresponding first scan line, and the each of the plurality of second shift registers may output a second scan signal having a turn-on voltage level to the corresponding second scan line.

In a blank period that does not overlap the active period during the one frame period, the first scan driving circuit may output a first scan signal having a turn-off voltage level to each of the plurality of first scan lines, and the second scan driving circuit may output the second scan signal having the turn-on voltage level to each of the plurality of second scan lines.

Each of the plurality of pixels may include a light emitting element. The number of flickers of the light emitting element in the blank period may be controlled depending on a cycle at which the data voltages are inputted to each of the plurality of pixels.

The each of the plurality of pixels may include: a first transistor configured to supply driving current to the light emitting element; a second transistor configured to switch electrical connection between the driving transistor and any one data line of the plurality of data lines; and a third transistor configured to switch electrical connection between the light emitting element and a reference voltage line.

The blank period may include: an initialization period in which the second scan signal having a turn-on level is supplied to a second scan line electrically connected to the each of the plurality of pixels; and an emission period in which the second scan signal having a turn-off level is inputted to the second scan line.

The timing controller may output a first scan clock signal and a second scan clock signal. The first scan driving circuit may output the first scan signal to the corresponding first scan line in synchronization with the first scan clock signal. The second scan driving circuit may output the second scan signal to the corresponding second scan line in synchronization with the second scan clock signal. In at least a partial period of the blank period, the first scan clock signal may have a voltage of a turn-off logic level and the second scan clock signal may toggle between a voltage of a turn-on logic level and a voltage of a turn-off logic level.

The blank period may include a holding period. The timing controller may output, when image data of a subsequent frame is received during the blank period, a first scan clock signal of the turn-off logic level and a second scan clock signal of the turn-off logic level during the holding period.

The timing controller may output, when image data of the subsequent frame is received during the blank period, a first reset signal of a turn-on logic level and a second reset signal of a turn-off logic level.

The second scan driving circuit may suspend the output of the second scan signal during the holding period.

In a dummy period after the holding period, the timing controller may output the first scan clock signal of a turn-on logic level and the turn-off logic level, and output the second scan clock signal of the turn-on logic level and the turn-off logic level.

In the dummy period, the second scan driving circuit may resume the output of the second scan signal.

During the at least partial period of the blank period, when image data for displaying an image of a subsequent frame is inputted to the timing controller, the blank period of the one frame and an active period of the subsequent frame at least may partially overlap each other.

At least one of the plurality of shift registers may include a Q node configured to store a carry signal inputted from any one preceding first shift register among the plurality of first shift registers. When the first reset signal is inputted, a voltage of the Q node may be reduced to a base voltage.

The at least one of the plurality of first shift registers may further include: a reset signal input pin configured to receive the first reset signal; a first pin configured to receive a first scan clock signal; a second pin configured to receive a carry clock signal; a third pin configured to output the first scan signal; a fourth pin configured to output a carry signal; a scan signal controller configured to switch electrical connection between the first pin and the third pin, in response to the voltage of the Q node; a carry signal controller configured to switch electrical connection between the second pin and the fourth pin in response to the voltage of the Q node; and a global resetter configured to switch electrical connection between the Q node and a power line to which a constant voltage is applied in response to the first reset signal.

Any one the plurality of second shift registers may include a first pin configured to receive the first reset signal and a second pin configured to receive the second reset signal.

The any one of the plurality of second shift registers may include a dummy shift register configured not to output the second scan signal.

The timing controller may include: a data enable signal generator configured to generate a data enable signal; a preceding signal generator configured to generate a preceding signal corresponding to a frequency of the data enable signal; and a scan clock signal generator configured to generate a scan clock signal based on a signal outputted from the preceding signal generator. The timing controller may output the first reset signal synchronized with the preceding signal and output the second reset signal at a timing different from a timing at which the first reset signal is outputted.

The preceding signal generator may generate a preceding signal having a constant logic level at a timing at which the second reset signal is outputted.

The timing controller may further include a masking block configured to remove at least a portion of the preceding signal based on the data enable signal. The masking block may count the number of pulses included in the preceding signal, may mask at least a portion of the preceding signal based on the counted number of pulses, and may output the masked preceding signal.

DETAILED DESCRIPTION

Figure 1:
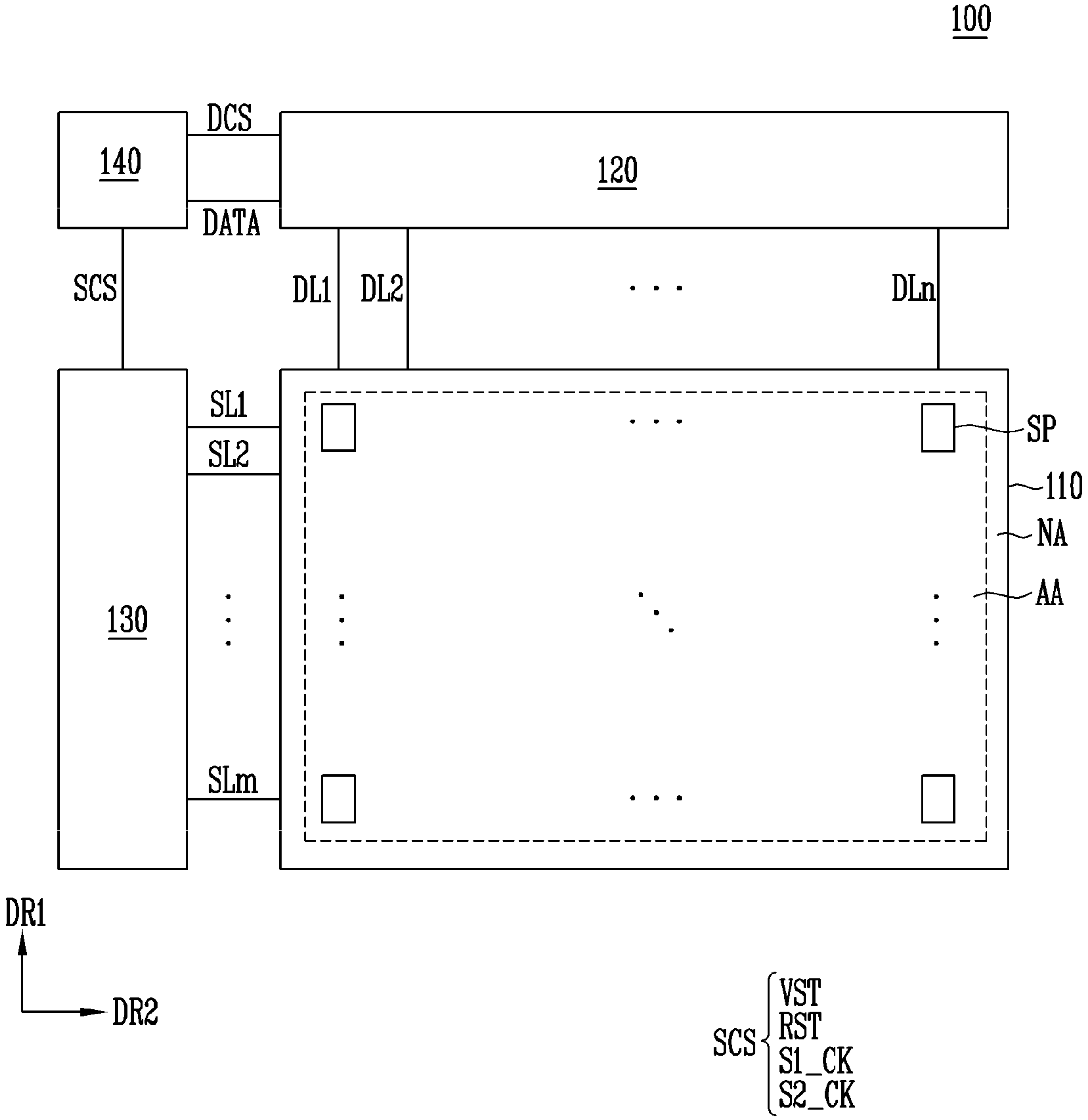
FIG. 1 is a system block diagram of a display device in accordance with embodiments of the present disclosure.

Hereinafter, embodiments of the present inventive concept will be described in detail with reference to the attached drawings, such that those skilled in the art can easily implement the present inventive concept. The present disclosure may be implemented in various forms, and is not limited to the embodiments to be described herein below.

In the drawings, portions which are not related to the present disclosure will be omitted in order to explain the present disclosure more clearly. Reference should be made to the drawings, in which similar reference numerals are used throughout the different drawings to designate similar components. Therefore, the aforementioned reference numerals may be used in other drawings.

For reference, the size of each component and the thicknesses of lines illustrating the component are arbitrarily represented for the sake of explanation, and the present disclosure is not limited to what is illustrated in the drawings. In the drawings, the thicknesses of the components may be exaggerated to clearly depict multiple layers and areas.

Furthermore, the expression "being the same" may mean "being substantially the same". In other words, the expression "being the same" may include a range that can be tolerated by those skilled in the art. The other expressions may also be expressions from which "substantially" has been omitted.

FIG. 1 is a system block diagram illustrating a display device 100 in accordance with embodiments of the present disclosure.

Referring to FIG. 1, the display device 100 in accordance with embodiments of the present disclosure may include a display panel 110, a data driving circuit 120, a scan driving circuit 130, a timing controller 140, and the like.

A plurality of scan lines SL1 to SLm (m is an integer greater than 1), and a plurality of data lines DL1 to DLn (n is an integer greater than 1) may be disposed in the display panel 110.

The plurality of data lines DL1 to DLn may be disposed to extend in a first direction DR1. The first direction DR1 may be, for example, a direction which intersects an upper side and a lower side of the display panel 110. Alternatively, the first direction DR1 may be a direction which intersects a left side and a right side of the display panel 110, or may indicate other directions. In the following description, for convenience of explanation, the first direction DR1 is the direction which intersects the upper side and the lower side of the display panel 110, but the present disclosure is not limited thereto.

The plurality of scan lines SL1 to SLn may be disposed to extend in a second direction DR2. The second direction DR2 may be a direction perpendicular to the first direction DR1. The second direction DR2 may be, for example, a direction which intersects the left side and the right side of the display panel 110. Alternatively, the second direction DR2 may be a direction which intersects the upper side and the lower side of the display panel 110, or may indicate other directions. In the following description, for convenience of explanation, the second direction DR2 is the direction which intersects the left side and the right side of the display panel 110, but the present disclosure is not limited thereto.

The expression "the plurality of data lines DL1 to DLn are disposed to extend in the first direction DR1" may mean that the plurality of data lines DL1 to DLn are disposed to generally extend from the upper side to the lower side, and may include that the plurality of data lines DL1 to DLn are disposed to partially extend in a direction different from the first direction DR1.

The expression "the plurality of scan lines SL1 to SLm are disposed to extend in the second direction DR2" may mean that the plurality of scan lines SL1 to SLm are disposed to generally extend from the left side to the right side, and may include that the plurality of scan lines SL1 to SLm are disposed to partially extend in a direction different from the second direction DR2.

A plurality of pixels SP, which are electrically connected to the plurality of scan lines SL1 to SLm and the plurality of data lines DL1 to DLn, are disposed in the display panel 110. Here, each pixel may also be referred to as a sub-pixel. The plurality of pixels SP may be disposed in a matrix configuration, or may be disposed in a trapezoidal shape (e.g., including a PENTILE™ structure). The plurality of pixels SP may be disposed in an RGB type or RGBG type arrangement. A scheme in which the plurality of pixels SP are disposed in the display panel 110 is not limited to the foregoing scheme.

The display panel 110 may include a display area AA, and a non-display area NA provided around the display area AA. The plurality of data lines DL1 to DLn, the plurality of scan lines SL1 to SLm, and the plurality of pixels SP may be disposed in the display area AA. In the non-display area NA, there may be a pad configured to supply voltages to various signal lines (e.g., the data lines, the scan lines) and power lines (e.g., power lines configured to apply a voltage of a certain level to the plurality of pixels which are disposed in the display area AA). The non-display area NA may also be referred to as a bezel area.

The data driving circuit 120 may output data voltages to the plurality of data lines DL1 to DLn. The data driving circuit 120 may generate data voltages based on data DATA for displaying an image and a data driving circuit control signal DCS, and output the generated data voltages to the plurality of data lines DL1 to DLn. The data driving circuit control signal DCS may include a data enable signal, a vertical synchronization signal, a horizontal synchronization signal, and the like.

The data enable signal may be a signal for controlling a timing at which the data driving circuit 120 outputs data voltages to the plurality of data lines DL1 to DLn. The data enable signal may include a plurality of pulses. The data driving circuit 120 may output a data voltage to each pixel row disposed on the display panel 110 in synchronization with a data enable signal. The data enable signal may be a signal that indicates valid data is transmitted to the display panel 110.

The scan driving circuit 130 may output scan signals to the plurality of scan lines SL1 to SLm. The scan driving circuit 130 may output scan signals to the plurality of scan lines SL1 to SLm, based on a scan driving circuit control signal SCS. For example, the scan driving circuit 130 may sequentially output scan signals to the plurality of scan lines SL1 to SLm.

The scan driving circuit control signal SCS may include, for example, a first reset signal VST, a second reset signal RST, a first scan clock signal S1_CK, and a second scan clock signal S2_CK.

Figure 8:
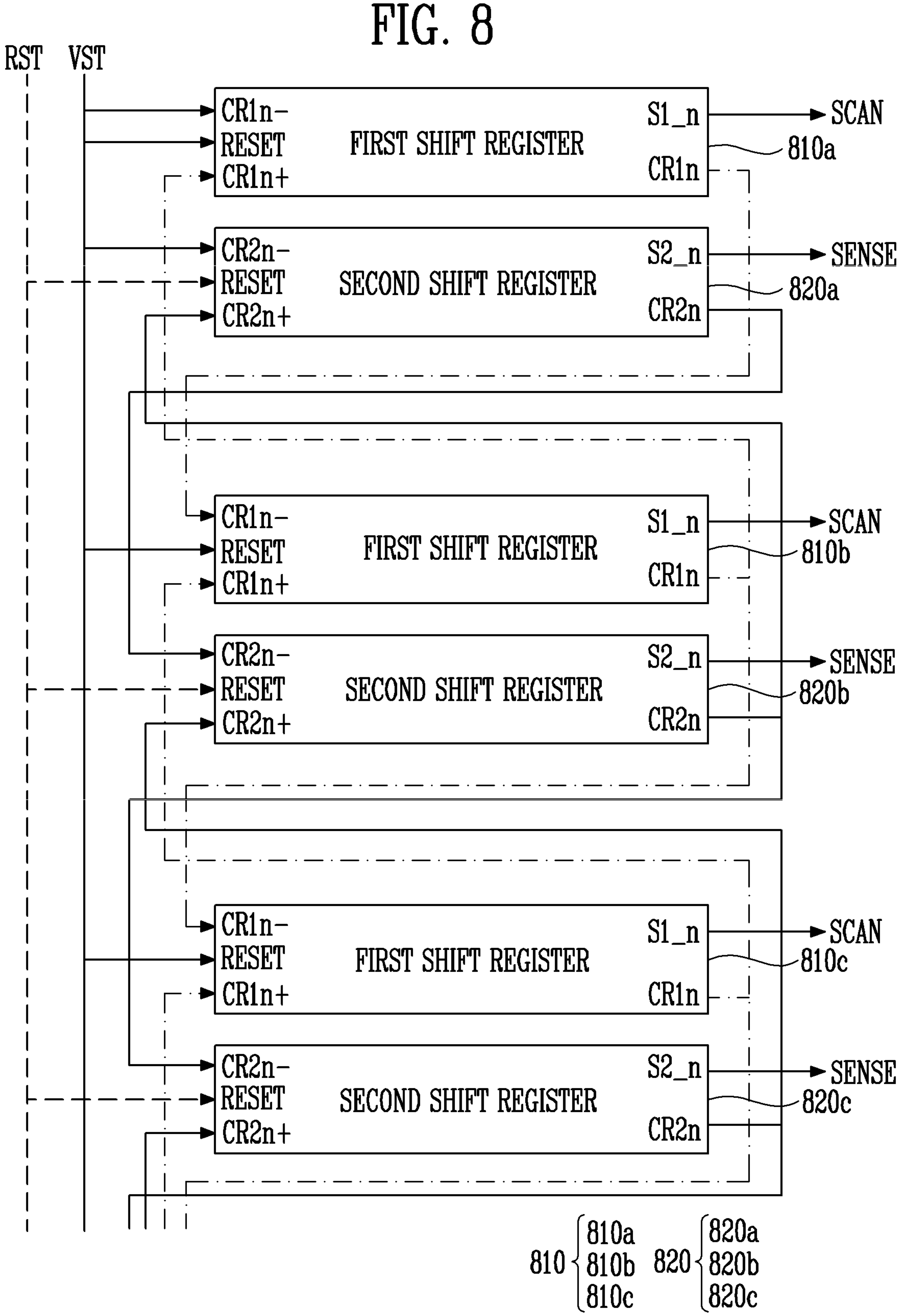
FIG. 8 is a diagram illustrating a scan driving circuit in accordance with embodiments of the present disclosure.

The scan driving circuit 130 may include a first scan driving circuit (810 in FIG. 8) and a second scan driving circuit (820 in FIG. 8). The first scan driving circuit 810 may be configured to receive the first reset signal VST and the first scan clock signal S1_CK. The second scan driving circuit 820 may be configured to receive the second reset signal RST and the second scan clock signal S2_CK. Detailed explanation of the first scan driving circuit and the second scan driving circuit will be made with reference to FIG. 8.

The scan driving circuit 130 may be disposed in the display device 100. The scan driving circuit 130 may be implemented as a separate integrated circuit (IC) chip, e.g., a gate driving integrated circuit (GDIC) chip. The scan driving circuit 130 may be formed along with the display panel 110 during a process of forming the display panel 110. For example, the scan driving circuit 130 may be formed along with the display panel 110 during the process of forming the display panel 110 in an oxide semiconductor thin film transistor gate driver circuit (OSG) or an amorphous silicon thin film transistor gate driver circuit (ASG). The scan driving circuit 130 may be formed in the non-display area NA of the display panel 110. At least a portion of the scan driving circuit 130 may be formed to overlap the display area AA.

The timing controller 140 may be configured to control the data driving circuit 120 and the scan driving circuit 130. The timing controller 140 may receive image data and a synchronization signal from an external device (e.g., a host system or the like). The timing controller 140 may output a data signal DATA, a data driving circuit control signal DCS, a scan driving circuit control signal SCS, and the like, based on the received image data and the synchronization signal.

Each display driving circuit (e.g., the data driving circuit 120, the scan driving circuit 130, or the timing controller 140) may be disposed in the display device 100 in an integrated circuit (IC) chip. In some cases, two or more display driving circuits (e.g., the data driving circuit 120 and the timing controller 140) may be embedded in a single integrated circuit chip.

Referring to FIG. 1, the display device 100 in accordance with embodiments of the present disclosure is illustrated as being a planar display device, but the embodiments of the present disclosure are not limited thereto. For example, the display device 100 in accordance with embodiments of the present disclosure may include a curved display device in which at least a portion of the display area AA is bent. The display device 100 in accordance with embodiments of the present disclosure may include a flexible display device in which at least a portion of the display area AA can be folded or bent. The display device 100 in accordance with embodiments of the present disclosure may include a stretchable display device in which at least a portion of the display area AA can stretch.

The display device 100 in accordance with embodiments of the present disclosure may be a device configured to display a video or a static image, and may include potable electronic devices such as a mobile phone, a smart phone, a tablet personal computer (a tablet PC), a smart watch, a watch phone, a mobile communication terminal, an electronic note, an electronic book, a potable multimedia player (PMP), a navigator, and an ultra mobile PC (UMPC). The display device 100 in accordance with embodiments of the present disclosure may include electronic devices such as a television, a notebook computer, a monitor, an advertisement board, and an internet of things (IoT).

Figure 2:
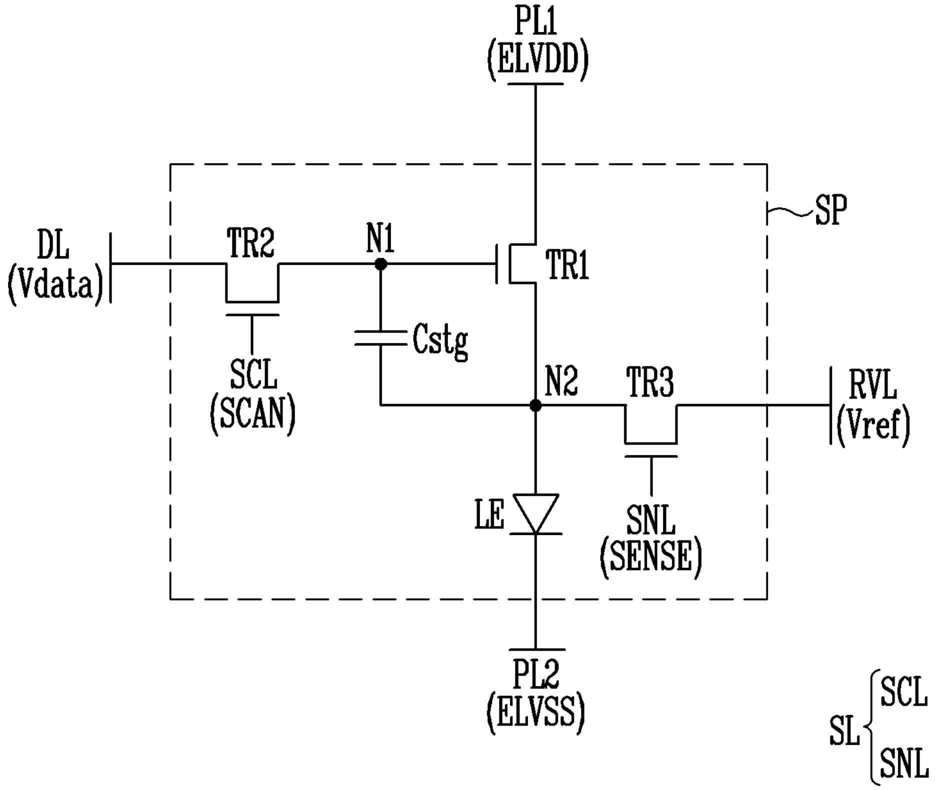
FIG. 2 illustrates a pixel in accordance with embodiments of the present disclosure.

FIG. 2 illustrates a pixel SP in accordance with embodiments of the present disclosure.

Referring to FIG. 2, the pixel SP in accordance with embodiments of the present disclosure may include a light emitting element LE, and a first transistor TR1 configured to supply driving current to the light emitting element LE.

The light emitting element LE may include an emission layer. The light emitting element LE may include an organic light emitting element including an organic emission layer, an inorganic light emitting element including an inorganic emission layer, a quantum dot light emitting element including a quantum dot, and the like, but is not limited thereto. Although, for convenience of explanation, the following description will be made on the assumption that the light emitting element LE is formed of an organic light emitting element including an organic emission layer, the present disclosure is not limited thereto.

The light emitting element LE may include a first electrode (either an anode electrode or a cathode electrode), a second electrode (a remaining one of the anode electrode and the cathode electrode), and an emission layer. Referring to FIG. 2, the light emitting element LE may include a first electrode electrically connected to a second node N2, and a second electrode electrically connected to a second power line PL2. The light emitting element LE may include an emission layer (not illustrated) located between the first electrode and the second electrode. The second power line PL2 may be a common voltage line which may be supplied with a low potential common voltage ELVSS. The first electrode of the light emitting element LE may be an anode electrode, and the second electrode may be a cathode electrode.

Referring to FIG. 2, the pixel SP may include a first transistor TR1 configured to supply driving current to the light emitting element LE. The first transistor TR1 may also be referred to as a driving transistor. The first transistor TR1 may include a first electrode electrically connected to a first node N1, a second electrode electrically connected to a first power line PL1, and a third electrode electrically connected to the light emitting element LE. The first power line PL1 may be a common voltage line which may be supplied with a high potential common voltage ELVDD. The first electrode of the first transistor TR1 may be a gate electrode, and the second electrode thereof may be either a source electrode or a drain electrode (e.g., may be the drain electrode), and the third electrode thereof may be a remaining one of the source electrode and the drain electrode (e.g., may be the source electrode).

The pixel SP may include a second transistor TR2 configured to switch electrical connection between the first node N1 and the data line DL. The second transistor T2 may also be referred to as a scan transistor, or a switching transistor. The second transistor T2 may be controlled by a first scan signal SCAN. The first scan signal SCAN may be applied to a first scan line SCL.

The first scan signal SCAN may have a turn-on level voltage or a turn-off level voltage. Depending on the type of second transistor TR2, the turn-on level voltage may be either a high logic level voltage or a low logic level voltage, and the turn-off level voltage may be a remaining one of the high logic level voltage and the low logic level voltage.

The second transistor TR2 may be implemented as a p-type transistor including a p-type semiconductor layer. Alternatively, the second transistor TR2 may be implemented as an n-type transistor including an n-type semiconductor layer.

The pixel SP may include a third transistor TR3 configured to switch electrical connection between the second node N2 and a reference voltage line RVL. The third transistor TR3 may also be referred to as a sense transistor. The third transistor TR3 may be controlled by a second scan signal SENSE. The second scan signal SENSE may be applied to a second scan line SNL.

A reference voltage Vref may be applied to the reference voltage line RVL. When the third transistor TR3 is turned on, the reference voltage Vref may be applied to the second node N2. When the reference voltage Vref is applied to the second node N2, the light emitting element LE may be turned off. A voltage difference between the reference voltage Vref and the low potential common voltage ELVSS may be less than a threshold voltage of the light emitting element LE. For example, a voltage level of the reference voltage Vref may be identical or similar to the low potential common voltage ELVSS.

The scan line SL described above with reference to FIG. 1 may include a first scan line SCL and a second scan line SNL. For example, the first scan line SL1 on a first row may include a $1^{st}$ first scan line SCL and a $1^{st}$ second scan line SNL.

The first scan signal SCAN may be generated and outputted from the first scan driving circuit 810. The second scan signal SENSE may be generated and outputted from the second scan driving circuit 820.

Referring to FIG. 2, in embodiments of the present disclosure, the first to third transistors TR1 to TR3 each may be implemented as an n-type transistor including an n-type semiconductor layer. Embodiments of the present disclosure are not limited to the foregoing. For example, at least one transistor of the first to third transistors TR1 to TR3 may be implemented as a p-type transistor including a p-type semiconductor layer. Although, for convenience of explanation, the following description will be made on the assumption that each of the first to third transistors TR1 to TR3 is an n-type transistor, the present disclosure is not limited thereto.

In the case where the second transistor TR2 is implemented as an n-type transistor, the turn-on level voltage of the first scan signal SCAN is a high logic level voltage, and the turn-off level voltage of the first scan signal SCAN is a low logic level voltage.

In the case where the third transistor TR3 is implemented as an n-type transistor, the turn-on level voltage of the second scan signal SENSE is a high logic level voltage, and the turn-off level voltage of the second scan signal SENSE is a low logic level voltage.

The pixel SP may include a storage capacitor Cstg configured to store a data voltage Vdata (or a voltage corresponding to the data voltage Vdata). Referring to FIG. 2, the storage capacitor Cstg may include a first end electrically connected to the first node N1, and a second end electrically connected to the second node N2. The data voltage Vdata may be applied to the first end of the storage capacitor Cstg. The reference voltage Vref may be applied to the second end of the storage capacitor Cstg. The storage capacitor Cstg may store a voltage corresponding to a difference between a voltage applied to the first end thereof and a voltage applied to the second end thereof.

The light emitting element LE may emit light during a corresponding frame based on a voltage stored in the storage capacitor Cstg (e.g., a voltage corresponding to the data voltage Vdata).

Figure 3:
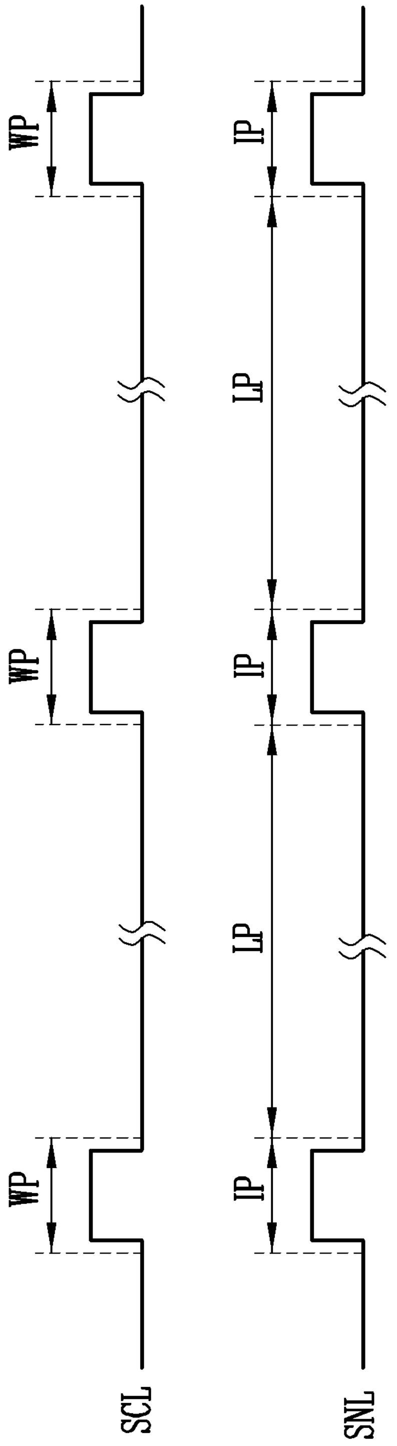
FIG. 3 is a diagram illustrating a waveform of a first scan line and a waveform of a second scan line in accordance with embodiments of the present disclosure.

FIG. 3 is a diagram illustrating a waveform of the first scan line SCL and a waveform of the second scan line SNL in accordance with embodiments of the present disclosure.

A period during which a turn-on level voltage is applied to the first scan line SCL may correspond to a data write period WP (or referred also to as a write period WP). If a frame starts (or a frame transition is made), a data voltage Vdata (refer to FIG. 2) may be inputted (or written, or applied) to the pixel. In the data write period WP, a data voltage for displaying an image of the corresponding frame may be inputted to the pixel. The pixel may store the inputted data voltage in the storage capacitor, and emit light during at least a partial period of the corresponding frame based on the stored data voltage.

A period in which a turn-on level voltage is applied to the second scan line SNL may correspond to an initialization period IP. If a frame starts, a reference voltage Vref (refer to FIG. 2) may be inputted to the pixel. In the initialization period IP, the reference voltage is inputted to the pixel, and the light emitting element of the pixel does not emit light.

A period in which a turn-off level voltage is applied to the second scan line SNL may include an emission period LP. The pixel may emit light in the emission period LP based on the data voltage inputted in the data write period WP.

Referring to FIG. 3, the data write period WP and the initialization period IP may overlap each other. In an embodiment, the data write period WP and the initialization period IP may match each other, but the present disclosure is not limited thereto.

Figure 4A:
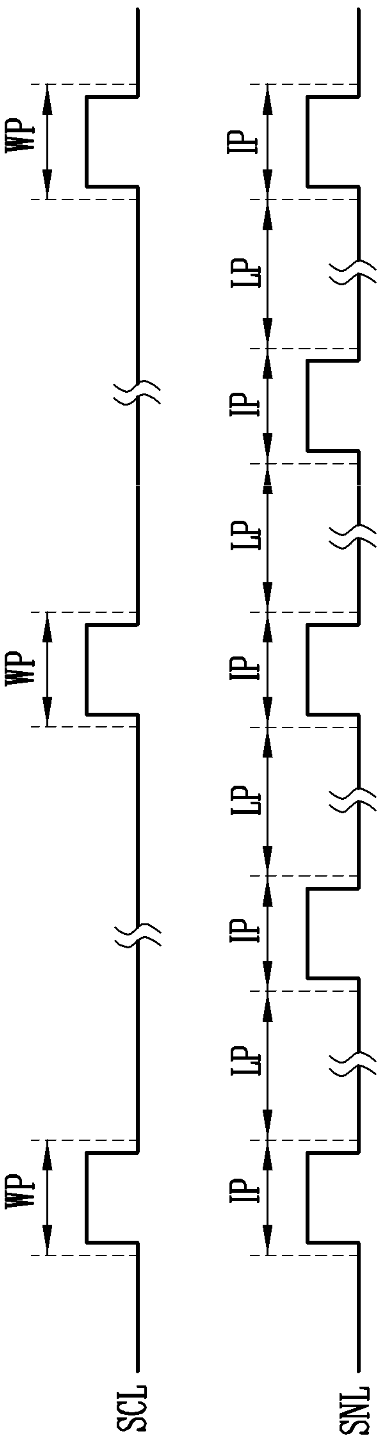
FIG. 4A is a diagram illustrating, in the case where an image is displayed at a refresh rate lower than that of an embodiment of FIG. 3, a waveform of the first scan line and a waveform of the second scan line in accordance with embodiments of the present disclosure.

FIG. 4A is a diagram illustrating, in the case where an image is displayed at a refresh rate lower than that of an embodiment of FIG. 3, a waveform of the first scan line SCL and a waveform of the second scan line SNL in accordance with embodiments of the present disclosure.

If a refresh rate (a frequency at which a frame transition is made, or a cycle at which a data voltage is inputted to the pixel) is reduced, the proportion of the initialization period IP in a single frame period may be reduced. In other words, in a single frame period, a non-emission period in which the light emitting element does not emit light may be relatively reduced. In this case, a rapid luminance increase or reduction phenomenon may be visible to the user. The foregoing phenomenon may be visible to the user as a flicker.

To mitigate the flicker, in embodiments of the present disclosure, a turn-on level voltage may be applied to the second scan line SNL during a period in which a turn-off level voltage is applied to the first scan line SCL. Referring to FIG. 4A, in a single frame period, an initialization period IP may progress in a period which does not overlap the data write period WP.

Referring to FIG. 4A, the light emitting element of the pixel may flicker in a single frame period. If the refresh rate is reduced, the light emitting element may be periodically turned off (for example, at a preset cycle). According to the foregoing, the phenomenon in which a rapid luminance increase or reduction resulting from a change in refresh rate is visible to the user may be mitigated. Consequently, the visibility may be improved.

Figure 4B:
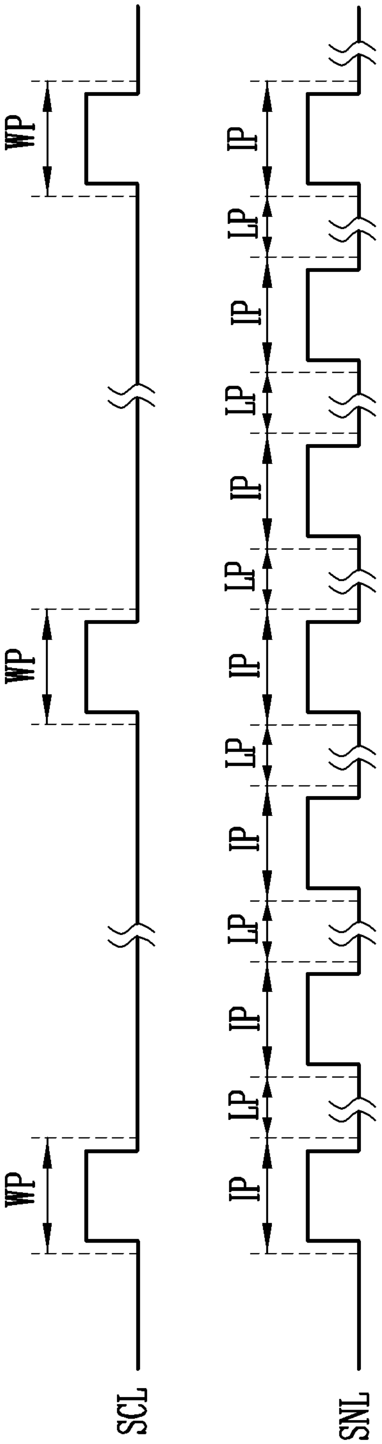
FIG. 4B is a diagram illustrating, in the case where an image is displayed at a refresh rate lower than that of an embodiment of FIG. 4A, a waveform of the first scan line and a waveform of the second scan line in accordance with embodiments of the present disclosure.

FIG. 4B is a diagram illustrating, in the case where an image is displayed at a refresh rate lower than that of an embodiment of FIG. 4A, a waveform of the first scan line SCL and a waveform of the second scan line SNL in accordance with embodiments of the present disclosure.

Referring to FIG. 4B, in a single frame period, two or more initialization periods IP may progress in a period which does not overlap the data write period WP.

Referring to FIGS. 3 to 4B, the refresh rate illustrated in FIG. 3 may be, for example, 240 Hz. The refresh rate illustrated in FIG. 4A may range, for example, from 80 Hz to 120 Hz. The refresh rate illustrated in FIG. 4B may range, for example, from 60 Hz to 80 Hz. Embodiments of the present disclosure are not limited to the foregoing description, and the foregoing description is only an example.

Figure 5:
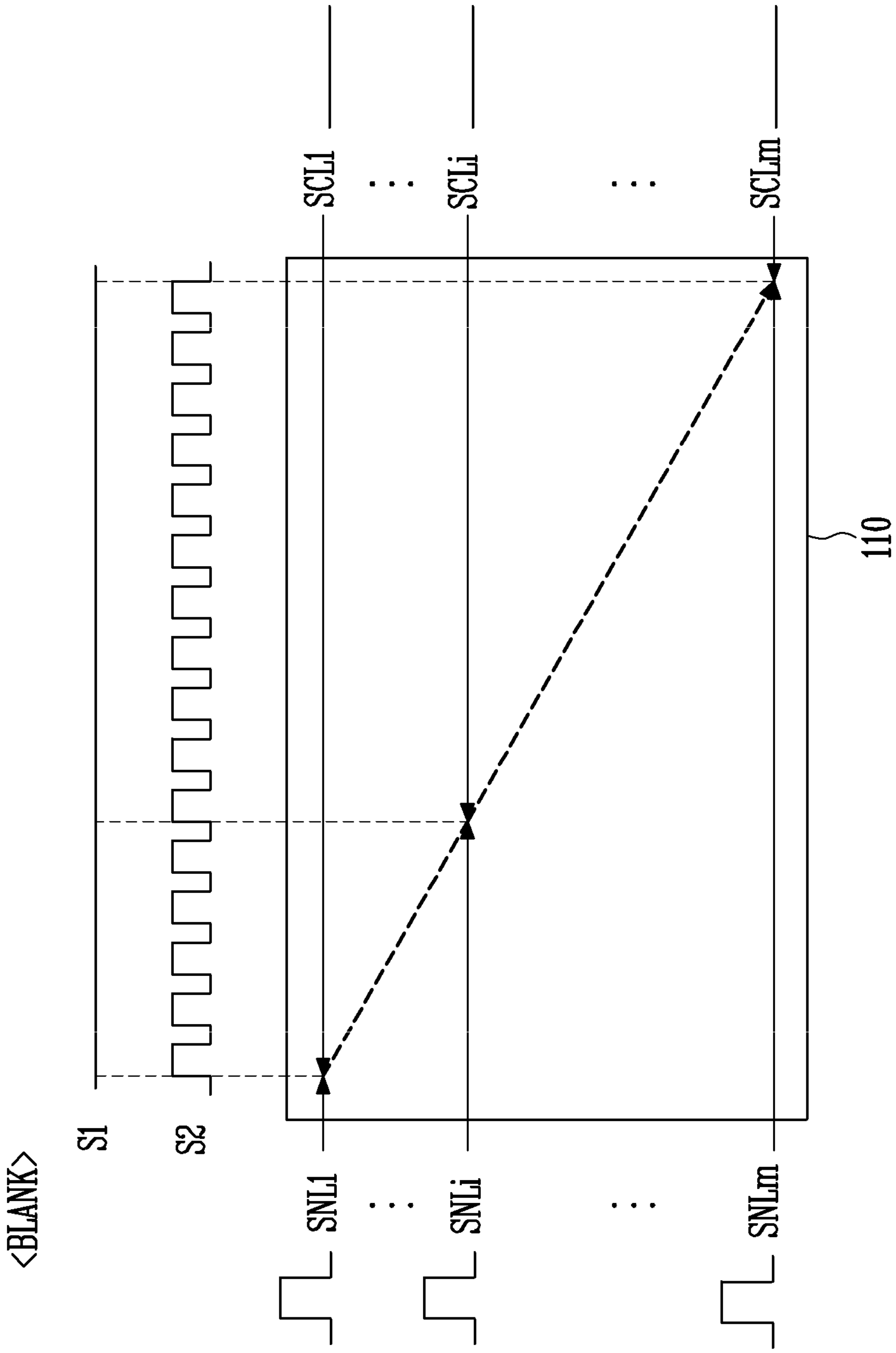
FIG. 5 is a diagram for describing a relationship between preceding signals and scan signals in accordance with embodiments of the present disclosure.

FIG. 5 is a diagram for describing a relationship between preceding signals S1 and S2 and scan signals in accordance with embodiments of the present disclosure.

Referring to FIG. 5, there are illustrated a first preceding signal S1 for generating scan signals to be applied to first scan lines SCL1 to SCLm, and a second preceding signal S2 for generating scan signals to be applied to second scan lines SNL1 to SNLm.

The first preceding signal S1 and the second preceding signal S2 may be, for example, a signal generated in the above-described timing controller 140 (refer to FIG. 1).

The timing controller may generate and output a scan driving circuit control signal SCS (refer to FIG. 1) based on the first preceding signal S1. The scan driving circuit may output first scan signals to the plurality of first scan lines SCL1 to SCLm in response to the inputted scan driving circuit control signal.

A timing at which the scan signals are applied to the plurality of first scan lines SCL1 to SCLm may be synchronized with the first preceding signal S1.

The timing controller may generate and output a scan driving circuit control signal SCS (refer to FIG. 1) based on the second preceding signal S2. The scan driving circuit may output second scan signals to the plurality of second scan lines SNL1 to SNLm in response to the inputted scan driving circuit control signal.

A timing at which the scan signals are applied to the plurality of second scan lines SNL1 to SNLm may be synchronized with the second preceding signal S2.

Referring to FIG. 5, there are illustrated signals applied to the plurality of scan lines SCL1 to SCLm and the plurality of second scan lines SNL1 to SNLm in a blank period BLANK. The blank period may include a period in which a data voltage for displaying an image on the display panel 110 is not applied.

Referring to FIG. 5, scan signals may be sequentially applied to the plurality of scan lines SCL1 to SCLm and the plurality of second scan lines SNL1 to SNLm.

In the blank period BLANK, the first preceding signal S1 may have a constant logic level. In the blank period BLANK, the first preceding signal S1 may not toggle. A turn-off level voltage may be applied to the plurality of first scan lines SCL1 to SCLm.

In the blank period BLANK, the second preceding signal S2 may have a high logic level and a low logic level. In the blank period BLANK, the second preceding signal S2 may toggle. A turn-on level voltage may be sequentially applied to the plurality of second scan lines SNL1 to SNLm at timings at which the second preceding signal S2 toggles.

In embodiments of the present disclosure, in the blank period BLANK, a first preceding signal S1 which does not toggle and a second preceding signal S2 which toggles may be generated. Hence, in the blank period BLANK, a turn-off level voltage may be outputted to the plurality of first scan lines SCL1 to SCLm, and a turn-on level voltage may be sequentially outputted to the plurality of second scan lines SNL1 to SNLm.

Figure 6:
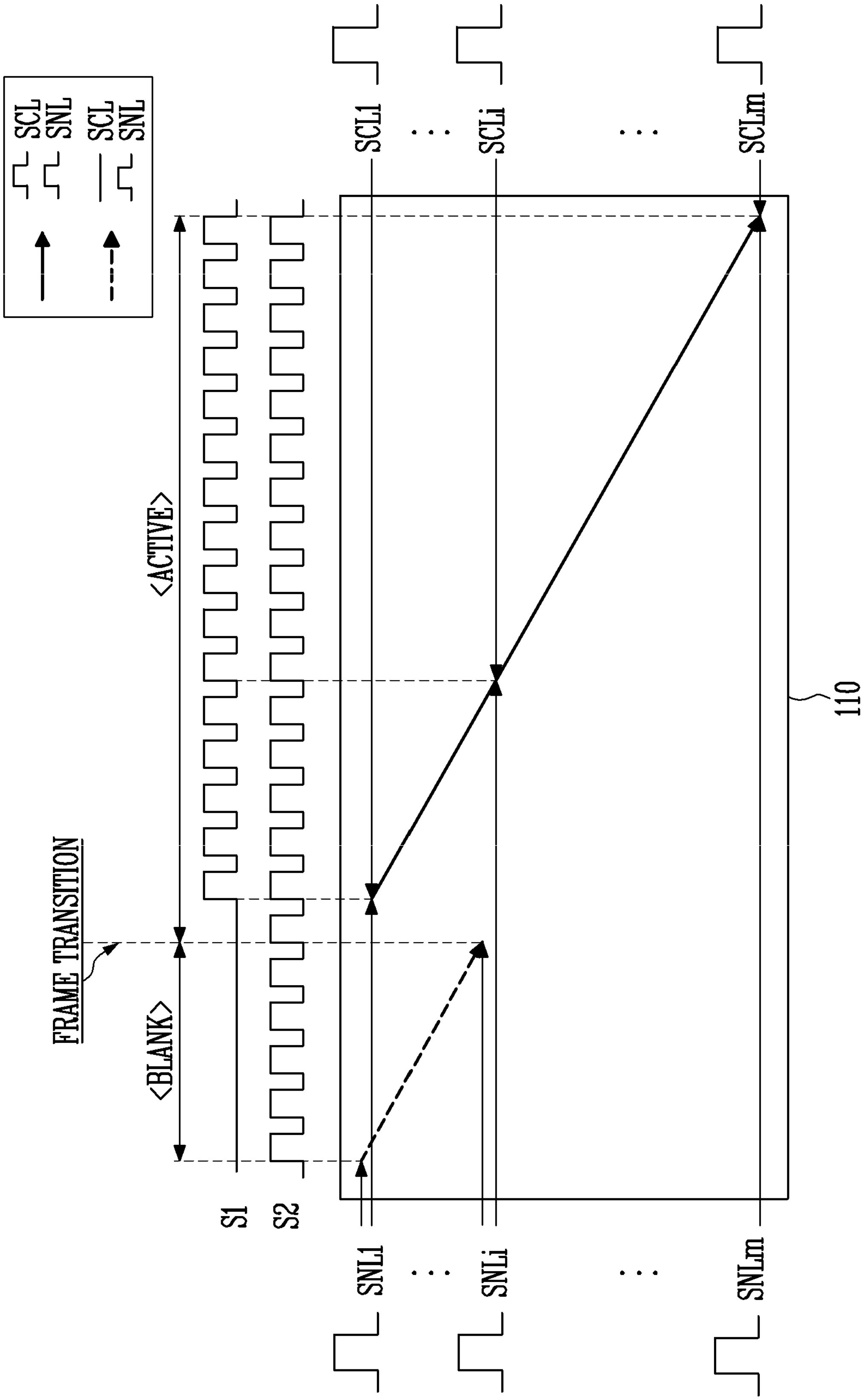
FIG. 6 is a diagram illustrating a frame transition in a blank period.

FIG. 6 is a diagram illustrating a frame transition in a blank period BLANK.

In FIG. 6, a dashed line on the display panel 110 indicates progress of a blank period BLANK, and a solid line on the display panel 110 indicates progress of an active period ACTIVE.

Referring to FIG. 6, in the blank period BLANK, immediately after a turn-on level voltage is applied to an i-th second scan lines SNLi, a frame transition may be made. In this case, after the turn-on level voltage is inputted to the i-th second scan line SNLi, the corresponding frame period may be terminated and a subsequent frame period may start.

When the active period ACTIVE, during which a data voltage for displaying an image on the display panel 110 is applied, starts, scan signals (e.g., a turn-on level voltage) may be sequentially inputted to the plurality of first scan lines SCL1 to SCLm and the plurality of second scan lines SNL1 to SNLm.

In this case, an image of the corresponding frame may be displayed on an i+1-th second scan line (not illustrated) to the m-th second scan line SNLm until a turn-on level scan signal is inputted in an active period ACTIVE of a subsequent frame. Therefore, the image is displayed in pixels disposed in i+1-th to m-th pixel rows of the display panel 110 for a relatively long period of time than pixels disposed in first to i-th pixel rows. Hence, there may be a difference in luminance between pixels disposed in i+1-th to m-th pixel rows of the display panel 110 and pixels disposed in first to i-th pixel rows, and the luminance difference may be visible to the user.

Figure 7:
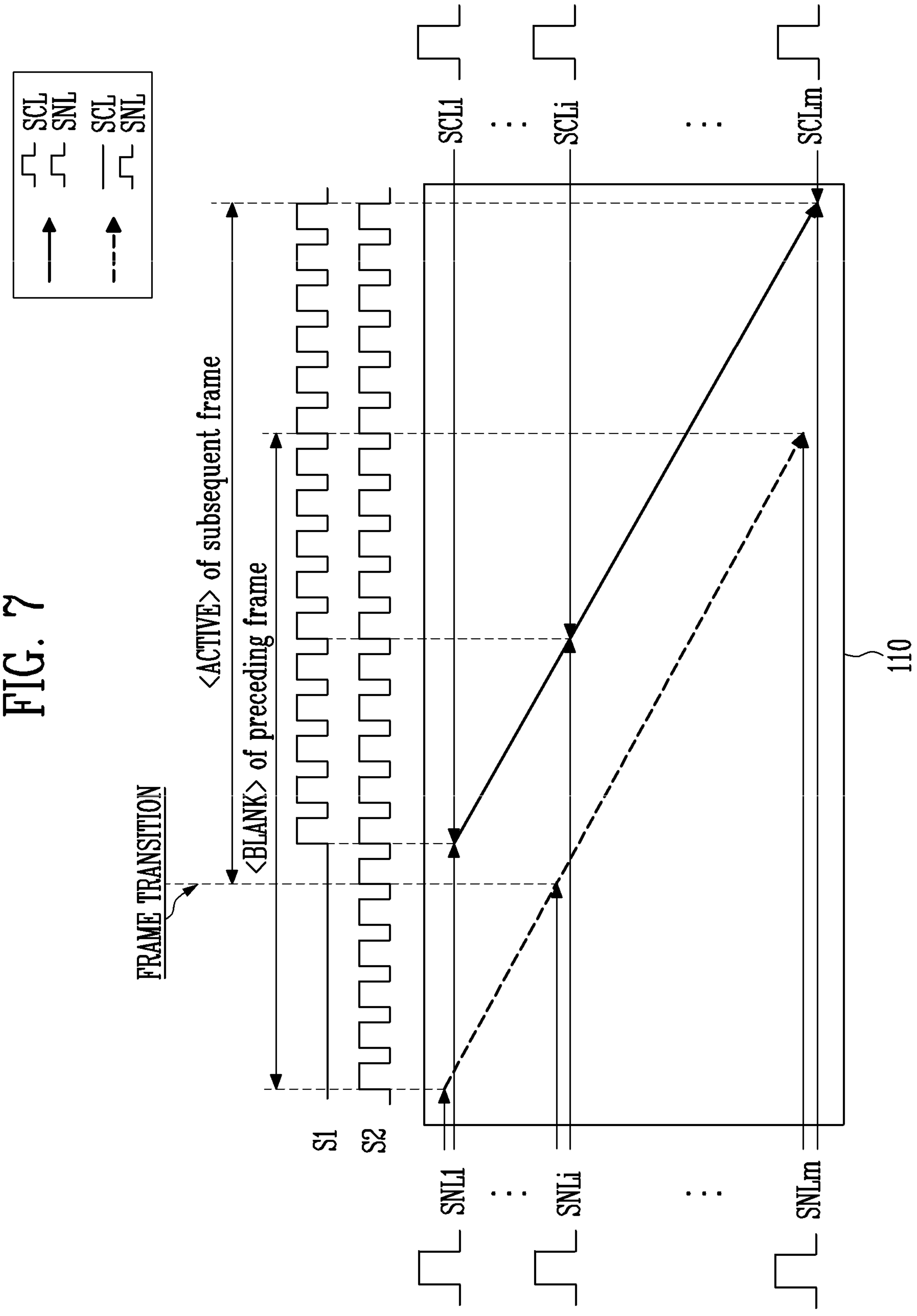
FIG. 7 is a diagram illustrating a frame transition in a blank period in accordance with embodiments of the present disclosure.

FIG. 7 is a diagram illustrating a frame transition in a blank period BLANK in accordance with embodiments of the present disclosure.

In FIG. 7, a dashed line on the display panel 110 indicates progress of a blank period BLANK (e.g., a blank period of a corresponding frame), and a solid line on the display panel 110 indicates progress of an active period ACTIVE (e.g., an active period of a subsequent frame).

Referring to FIG. 7, in embodiments of the present disclosure, even though a frame transition is made immediately after a turn-on level voltage is applied to the i-th second scan line SNLi, a turn-on level voltage may be sequentially inputted to the i+1-th to m-th second scan lines SNL(i+1) to SNLm.

In a period in which the turn-on level voltage is sequentially inputted to the i+1-th to m-th second scan lines SNL(i+1) to SNLm, a turn-on level voltage may be sequentially inputted to the second scan lines SNL in a sequence from the 1st second scan line SNL1. In a period in which the turn-on level voltage is sequentially inputted to the i+1-th to m-th second scan lines SNL(i+1) to SNLm, a turn-on level voltage may be sequentially inputted to the first scan lines SCL in a sequence from the 1st first scan line SCL1.

The foregoing may be understood that the blank period BLANK of the corresponding frame and the active period of the subsequent frame overlap each other.

Therefore, a luminance difference occurring between the pixels disposed in i+1-th to m-th pixel rows of the display panel 110 and the pixels disposed in first to i-th pixel rows may be mitigated (e.g., removed).

FIG. 8 is a diagram illustrating a scan driving circuit in accordance with embodiments of the present disclosure.

The scan driving circuit 130 (refer to FIG. 1) in accordance with embodiments of the present disclosure may include a first scan driving circuit 810 and a second scan driving circuit 820.

Referring to FIG. 8, the first scan driving circuit 810 may include a plurality of first shift registers 810*a*, 810*b*, and 810*c*.

Any one first shift register (e.g., the 2nd first shift register 810*b*) among the plurality of first shift registers 810*a*, 810*b*, and 810*c* may include a pin S1_*n* (e.g., a terminal or the like) configured to output a first scan signal SCAN. The any one first shift register 810*b* may include a pin CR1*n* configured to output a carry signal. The any one first shift register 810*b* may include a pin CR1*n*− configured to receive a carry signal outputted from a preceding first shift register (e.g., the 1st first shift register 810*a*). The any one first shift register 810*b* may include a pin CR1*n*+ configured to receive a signal outputted from a subsequent first shift register (e.g., the 3rd first shift register 810*c*).

In response to the carry signal outputted from the any one first shift register 810*b*, the plurality of first shift registers 810*a*, 810*b*, and 810*c* may sequentially output first scan signals SCAN.

Each of the plurality of first shift registers 810*a*, 810*b*, and 810*c* may include a reset signal input pin RESET configured to receive a first reset signal VST.

The first reset signal VST may be a signal for resetting the plurality of first shift registers 810*a*, 810*b*, and 810*c*. For example, if the first reset signal VST is inputted to any one first shift register, e.g., the 2nd first shift register 810*b*, information of the carry signal stored in the any one first shift register 810*b* may be removed. Hence, the any one first shift register 810*b* may not output a carry signal to the preceding first shift register 810*a* and the subsequent first shift register 810*c*. Therefore, the plurality of first shift registers 810*a*, 810*b*, and 810*c* may be reset.

Referring to FIG. 8, the second scan driving circuit 820 may include a plurality of second shift registers 820*a*, 820*b*, and 820*c*.

Any one second shift register, e.g., the 2nd second shift register 820*b*, among the plurality of second shift registers 820*a*, 820*b*, and 820*c* may include a pin S2_*n* configured to output a second scan signal SENSE. The any one second shift register 820*b* may include a pin CR2*n* configured to output a carry signal. The any one second shift register 820*b* may include a pin CR2*n*− configured to receive a carry signal outputted from a preceding second shift register (e.g., the 1st second shift register 820*a*). The any one second shift register 820*b* may include a pin CR2*n*+ configured to receive a signal outputted from a subsequent second shift register (e.g., the 3rd second shift register 820*c*).

In response to the carry signal outputted from the any one second shift register 820*b*, the plurality of second shift registers 820*a*, 820*b*, and 820*c* may sequentially output second scan signals SENSE.

Each of the plurality of second shift registers 820*a*, 820*b*, and 820*c* may include a reset signal input pin RESET configured to receive a second reset signal RST.

The second reset signal RST may be a signal for resetting the plurality of second shift registers 820*a*, 820*b*, and 820*c*. For example, if the second reset signal RST is inputted to the any one second shift register 820*b*, information of the carry signal stored in the any one second shift register 820*b* may be removed. Hence, the any one second shift register 820*b* may not output a carry signal to the preceding second shift register 820*a* and the subsequent second shift register 820*c*. Therefore, the plurality of second shift registers 820*a*, 820*b*, and 820*c* may be reset.

Different signals may be respectively inputted to the reset signal input pin RESET of the first scan driving circuit 810 and the reset signal input pin RESET of the second scan driving circuit 820. The first reset signal VST and the second reset signal RST may be inputted at different timings. For example, the first reset signal VST having a turn-on level voltage and the second reset signal RST having a turn-on level voltage may be inputted at different timings.

For example, if a new frame starts, the first reset signal VST may be inputted, but even if the new frame starts, the second reset signal RST may not be inputted.

When the second reset signal RST is inputted to the second scan driving circuit 820 after a new frame starts, the second scan driving circuit 820 is reset, so that the blank period of a preceding frame may not progress.

For example, the second reset signal RST may be inputted in a period during which the second scan driving circuit 820 dose not output the scan signal SENSE.

The first reset signal VST may be inputted to the most preceding shift register of each of the first scan driving circuit 810 and the second scan driving circuit 820.

For instance, the first reset signal VST may be a signal for indicating a timing at which the first scan driving circuit 810 sequentially outputs the scan signal SCAN. Referring to FIG. 8, the first reset signal VST may be inputted to the most preceding first shift register (e.g., the 1st first shift register 810*a*) of the first scan driving circuit 810.

For instance, the first reset signal VST may be a signal for indicating a timing at which the second scan driving circuit 820 sequentially outputs the scan signal SENSE. Referring to FIG. 8, the first reset signal VST may be inputted to the most preceding second shift register (e.g., the 1st second shift register 820*a*) of the second scan driving circuit 820.

Hence, in embodiments of the present disclosure, the first scan driving circuit 810 and the second scan driving circuit 820 may be controlled to be different from each other in reset timing. Therefore, in embodiments of the present disclosure, the visibility may be improved so that an image can be displayed at various refresh rates (or refresh frame rates).

Figure 9:
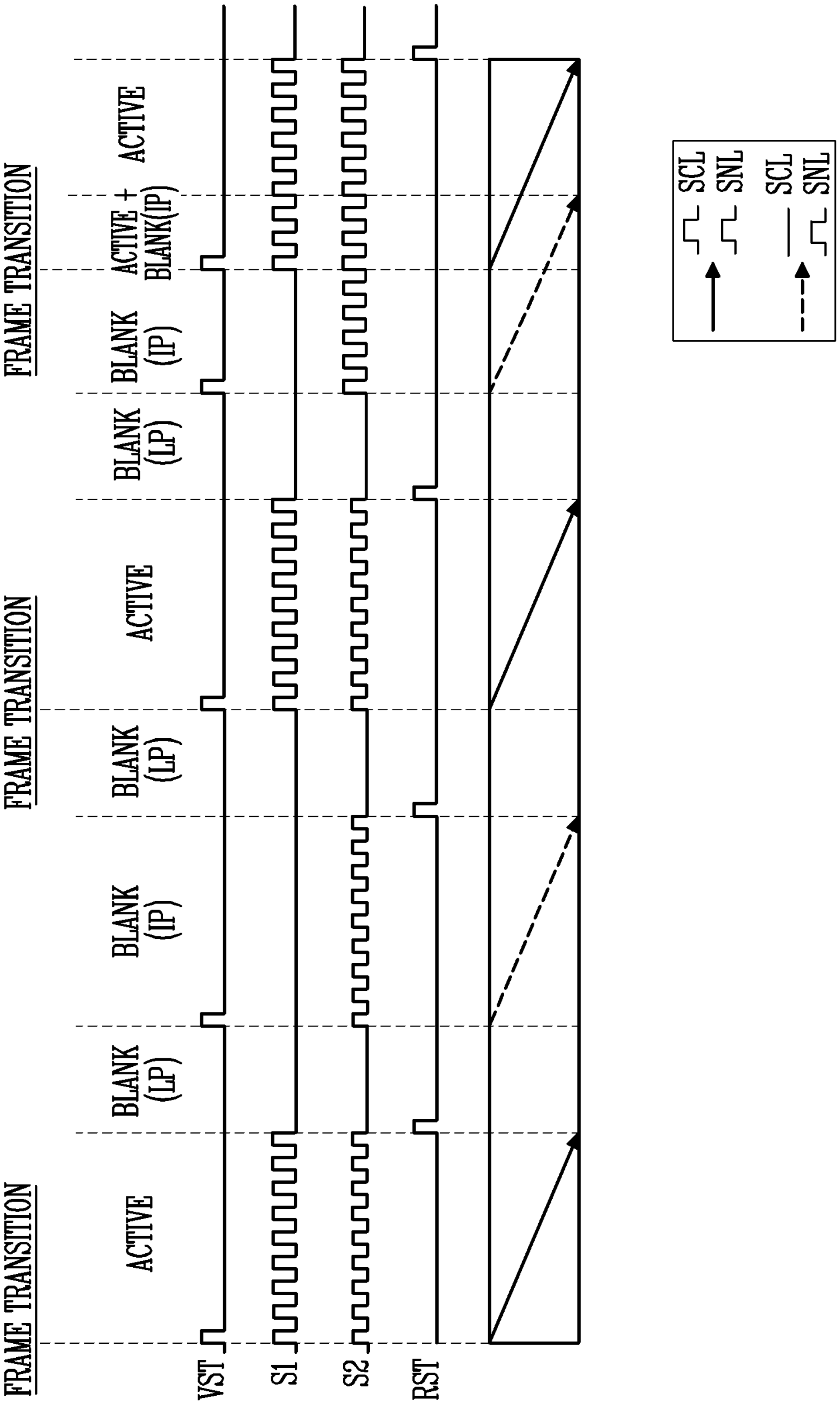
FIG. 9 is a diagram illustrating a relationship between a first reset signal, a second reset signal, and preceding signals in accordance with embodiments of the present disclosure.

FIG. 9 is a diagram illustrating a relationship between a first reset signal VST, a second reset signal RST, and preceding signals S1 and S2 in accordance with embodiments of the present disclosure.

The first reset signal VST may be a signal synchronized with the first preceding signal S1. For example, a timing at which the first reset signal VST is outputted may be the same (or substantially the same) as a timing at which the first preceding signal S1 begins to toggle.

The first reset signal VST may be a signal synchronized with the data enable signal described above with reference to FIG. 1.

The second reset signal RST may be a signal synchronized with the second preceding signal S2. For example, a timing at which the second reset signal RST is outputted may be the same (or substantially the same) as a timing at which the second preceding signal S2 begins to have a constant logic level (e.g., a low logic level). For instance, the timing at which the second reset signal RST is outputted may be the same (or substantially the same) as a timing at which the second preceding signal S2 begins not to toggle (or begins to be constant).

Referring to FIG. 9 along with FIGS. 7 and 8, the second reset signal RST may be inputted to the seconds scan driving circuit 820 in a period during which the second scan driving circuit does not output a second scan signal having a turn-on level.

Referring to FIG. 9, if a frame starts, an active period ACTIVE begins. After the active period ACTIVE is terminated, a blank period BLANK may progress. The blank period BLANK may include an emission period LP. The blank period BLANK may include an initialization period IP. Description of the emission period LP and the initialization period IP is the same as that described with reference to FIGS. 3, 4A, and 4B.

In the case where a subsequent frame starts during the initialization period IP, the initialization period IP of the corresponding frame and an active period ACTIVE of the subsequent frame at least partially overlap each other.

Figure 10:
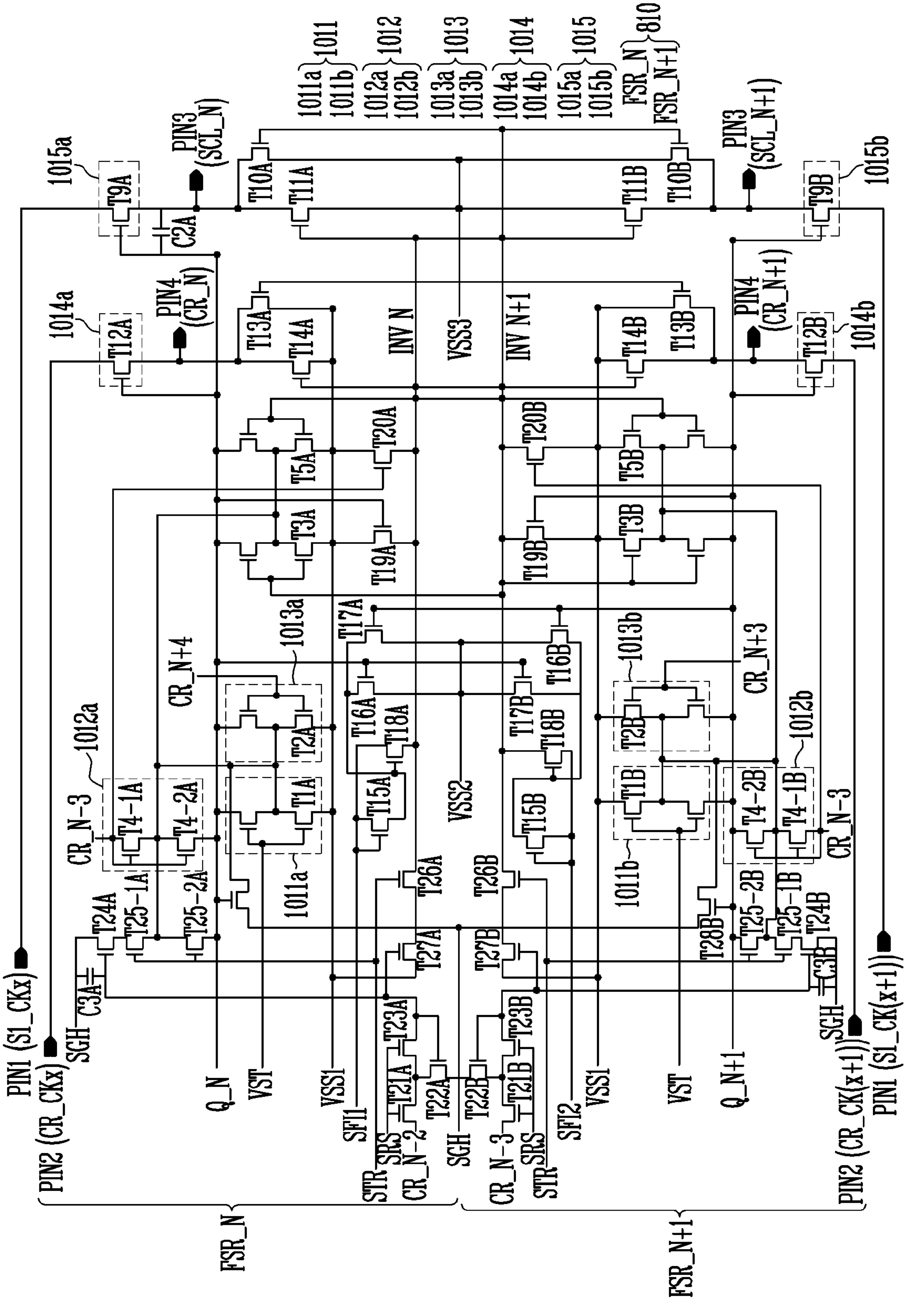
FIG. 10 is a diagram illustrating an N-th first shift register and an N+1-th first shift register in a first scan driving circuit in accordance with embodiments of the present disclosure.

FIG. 10 is a diagram illustrating an N-th first shift register FSR_N and an N+1-th first shift register FSR_N+1 in the first scan driving circuit 810 in accordance with embodiments of the present disclosure.

Referring to FIG. 10, the N-th first shift register FSR_N (where $1 \leq N \leq m-1$, and N is an odd number or an even number) in accordance with embodiments of the present disclosure may include a first pin PIN1 configured to receive a first scan clock signal S1_CKx (x is an integer larger than zero), a second pin PIN2 configured to receive a first carry clock signal CR_CKx, a third pin PIN3 electrically connected to a first scan line SCL_N, and a fourth pin PIN4 configured to output a carry signal CR_N.

Referring to FIG. 10, each of the first shift registers FSR_N and FSR_N+1 in accordance with embodiments of the present disclosure may include a first Q node controller 1012, a global resetter 1011, a second Q node controller 1013, a carry signal controller 1014, and a scan signal controller 1015.

The N-th first shift register FSR_N and the N+1-th first shift register FSR_N+1 may be designed in a similar (or substantially identical) scheme. For convenience of explanation, the following description will be made based on the N-th first shift register FSR_N, and the description of the N-th first shift register FSR_N may also be applied to the N+1-th first shift register FSR_N+1 in the same manner.

A first scan clock signal S1_CKx is inputted to the first pin PIN1. The first scan clock signal S1_CKx may include a first scan clock signal S1_CKx which is received from any one first scan clock signal line among a plurality of first scan clock signal lines. Description of the plurality of first scan clock signal lines will be made with reference to FIG. 12.

A carry clock signal CR_CKx is inputted to the second pin PIN2. The carry clock signal may include a carry clock signal CR_CKx which is inputted from one or more carry clock signal lines. The carry clock signal CR_CKx may be a signal which is inputted from the above-mentioned timing controller 140 (refer to FIG. 1).

The third pin PIN3 may be electrically connected to the first scan line SCL_N. The first scan line SCL_N that is electrically connected to the third pin PIN3 may be a first scan line electrically connected to pixels of an N-th pixel row.

The fourth pin PIN4 may be configured to output a carry signal CR_N). As described above with reference to FIG. 8, the carry signal CR_N outputted from the fourth pin PIN4 may be inputted to a preceding first shift register and/or a subsequent first shift register.

The N-th first shift register FSR_N in accordance with embodiments of the present disclosure may include a first Q node controller 1012*a* configured to switch electrical connection between a Q node Q_N and a carry signal CR_N−3 inputted from the preceding first shift register. The first Q node controller 1012*a* may include one or more transistors T4-1A and T4-2A. The first Q node controller 1012*a* may be controlled by the carry signal CR_N−3 inputted from the preceding first shift register.

Depending on the design, the carry signal inputted from the preceding first shift register may be a carry signal CR_N−3 inputted from an N−3-th first shift register, a carry signal CR_N−2 inputted from an N−2-th first shift register, a carry signal CR_N−4 inputted from an N−4-th first shift register, or the like.

The carry signal CR_N−3 inputted from the preceding first shift register may be applied to the Q node Q_N. In the same sense, information of the carry signal CR_N−3 inputted from the preceding first shift register may be stored in the Q node Q_N.

The N-th first shift register FSR_N in accordance with embodiments of the present disclosure may include a global resetter 1011*a* configured to reset the voltage of the Q node Q_N. The global resetter 1011*a* may include one or more transistors T1A. The global resetter 1011*a* may be configured to switch electrical connection between the Q node Q_N and a constant voltage line, e.g., a line to which a base voltage VSS1 (or a ground voltage) is applied. The global resetter 1011*a* may be controlled by the first reset signal VST. If the first reset signal VST having a turn-on level is applied, the Q node Q_N and the constant voltage line may be electrically connected to each other. Hence, the base voltage VSS1 may be applied to the Q node Q_N, and the information of the carry signal inputted from the preceding first shift register may be removed.

The N-th first shift register FSR_N in accordance with embodiments of the present disclosure may include a second Q node controller 1013*a* configured to switch electrical connection between the Q node Q_N and the constant voltage line. The constant voltage line may include, for example, a line to which the base voltage VSS1 is to be applied. The second Q node controller 1013*a* may include one or more transistors T2A. The second Q node controller 1013*a* may be controlled by a carry signal CR_N+4 inputted from a subsequent first shift register.

Depending on the design, the carry signal inputted from the subsequent first shift register may be a carry signal CR_N+4 inputted from an N+4-th first shift register, a carry signal CR_N+3 inputted from an N+3-th first shift register, a carry signal CR_N+5 inputted from an N+5-th first shift register, or the like.

The N-th first shift register FSR_N in accordance with embodiments of the present disclosure may include a carry signal controller 1014*a* configured to switch electrical connection between the second pin PIN2 and the fourth pin PIN4. The carry signal controller 1014*a* may include one or more transistors T12A. The carry signal controller 1014*a* may be controlled depending on the voltage of the Q node Q_N. When a turn-on level voltage is applied to the Q node Q_N, the carry clock signal CR_CKx inputted to the second pin PIN2 may be outputted through the fourth pin PIN4.

The N-th first shift register FSR_N in accordance with embodiments of the present disclosure may include a scan signal controller 1015*a* configured to switch electrical connection between the first pin PIN1 and the third pin PIN3. The scan signal controller 1015*a* may include one or more transistors T9A. The scan signal controller 1015*a* may be controlled depending on the voltage of the Q node Q_N. If a voltage having a turn-on level is applied to the Q node Q_N, the first scan clock signal S1_CKx inputted to the first pin PIN1 may be outputted through the third pin PIN3. The turn-on level voltage of the scan signal controller 1015*a* may be the same as the turn-on level voltage of the carry signal controller 1014*a*.

The N-th first shift register FSR_N may further include one or more pins configured to receive voltages SFI1, STR, SRS, SGH, VSS2, VSS3, and the like.

The N+1-th first shift register FSR_N+1 may have a structure similar (or substantially identical) to that of the N-th first shift register FSR_N. The N+1-th first shift register FSR_N+1 may include a first pin PIN1, a second pin PIN2, a third pin PIN3, a fourth pin PIN4, a Q node Q_N+1, a first Q node controller 1012*b*, a global resetter 1011*b*, a second Q node controller 1013*b*, a carry signal controller 1014*b*, a second signal controller 1015*b*, and the like.

When a first reset signal VST is inputted, the global resetter 1011*b* may be turned on, and the voltages of the Q nodes Q_N and Q_N+1 may be reset to the base voltage VSS1.

The terms "first pin PIN1", "second pin PIN2", "third pin PIN3", and "fourth pin PIN4" described in the detailed description of this specification are only ordinal expressions used to distinguish the components from each other. The first pin stated in the following claims of this specification may indicate any one of the first pin PIN1, the second pin PIN2, the third pin PIN3, and the fourth pin PIN4 that are stated in the detailed description. The foregoing may also be applied to the second pin, the third pin, and the fourth pin that are stated in the following claims of this specification, in the same manner.

Figure 11:
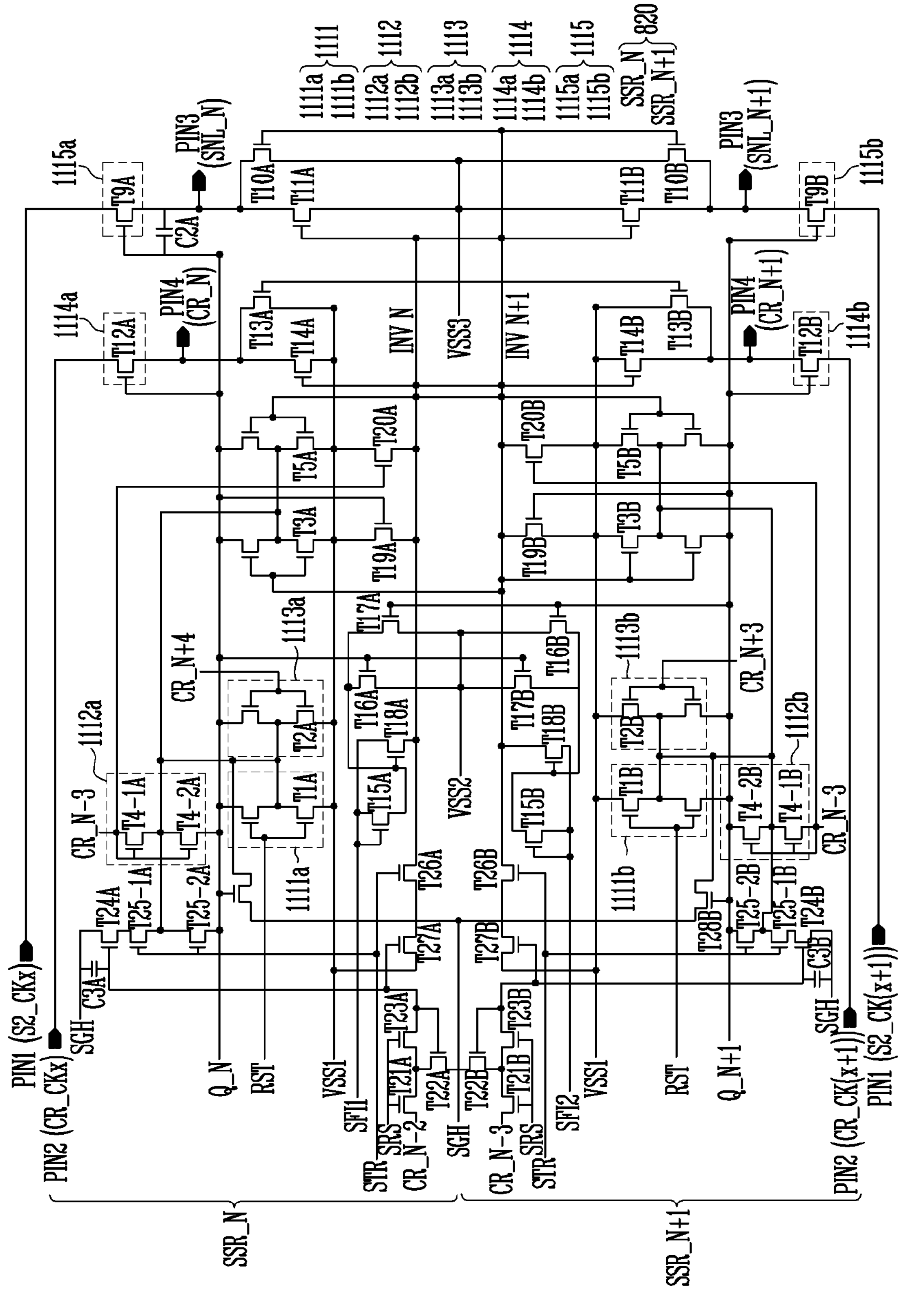
FIG. 11 is a diagram illustrating an N-th second shift register and an N+1-th second shift register in a second scan driving circuit in accordance with embodiments of the present disclosure.

FIG. 11 is a diagram illustrating an N-th second shift register SSR_N and an N+1-th second shift register SSR_N+1 in the second scan driving circuit in accordance with embodiments of the present disclosure.

Referring to FIG. 11, the N-th second shift register SSR_N in accordance with embodiments of the present disclosure may include a first pin PIN1 configured to receive a second scan clock signal S2_CKx, a second pin PIN2 configured to receive a second carry clock signal CR_CKx, a third pin PIN3 electrically connected to a second scan line SCL_N, and a fourth pin PIN4 configured to output a carry signal CR_N.

Referring to FIG. 11, each of the second shift registers SSR_N and SSR_N+1 in accordance with embodiments of the present disclosure may include a first Q node controller 1112, a global resetter 1111, a second Q node controller 1113, a carry signal controller 1114, and a scan signal controller 1115.

The N-th second shift register SSR_N and the N+1-th second shift register SSR_N+1 may be designed in a similar (or substantially identical) scheme. For convenience of explanation, the following description will be made based on the N-th second shift register SSR_N, and the description of the N-th second shift register SSR_N may also be applied to the N+1-th second shift register SSR_N+1 in the same manner.

A second scan clock signal S2_CKx is inputted to the first pin PIN1. The second scan clock signal S2_CKx may include a second scan clock signal S2_CKx that is received from any one second scan clock signal line among a plurality of second scan clock signal lines. Description of the plurality of second scan clock signal lines will be made with reference to FIG. 12.

The carry clock signal CR_CKx is inputted to the second pin PIN2. The carry clock signal may include a carry clock signal CR_CKx which is inputted from one or more carry clock signal lines. The carry clock signal CR_CKx may be a signal which is inputted from the above-mentioned timing controller 140 (refer to FIG. 1).

The third pin PIN3 may be electrically connected to the second scan line SNL_N. The second scan line SNL_N that is electrically connected to the third pin PIN3 may be a second scan line electrically connected to pixels of an N-th pixel row.

The fourth pin PIN4 may be configured to output a carry signal CR_N. As described above with reference to FIG. 8, the carry signal CR_N outputted from the fourth pin PIN4 may be inputted to a preceding second shift register and/or a subsequent second shift register.

The N-th second shift register SSR_N in accordance with embodiments of the present disclosure may include a first Q node controller 1112*a* configured to switch electrical connection between a Q node Q_N and a carry signal CR_N−3 inputted from the preceding second shift register. The first Q node controller 1112*a* may include one or more transistors T4-1A and T4-2A. The first Q node controller 1112*a* may be controlled by the carry signal CR_N−3 inputted from the preceding second shift register.

Depending on the design, the carry signal inputted from the preceding second shift register may be a carry signal CR_N−3 inputted from an N−3-th second shift register, a carry signal CR_N−2 inputted from an N−2-th second shift register, a carry signal CR_N−4 inputted from an N−4-th second shift register, or the like.

The carry signal CR_N−3 inputted to the preceding second shift register may be applied to the Q node Q_N. In the same sense, information of the carry signal CR_N−3 inputted from the preceding second shift register may be stored in the Q node Q_N.

The N-th second shift register SSR_N in accordance with embodiments of the present disclosure may include a global resetter 1111*a* configured to reset the voltage of the Q node Q_N. The global resetter 1111*a* may include one or more transistors T1A. The global resetter 1111*a* may be configured to switch electrical connection between the Q node Q_N and a constant voltage line (e.g., a line to which a base voltage VSS1 is applied). The global resetter 1111*a* may be controlled by the second reset signal RST. If the second reset signal RST having a turn-on level is applied, the Q node Q_N and the constant voltage line may be electrically connected to each other. Hence, the base voltage VSS1 may be applied to the Q node Q_N, and the information of the carry signal inputted from the preceding second shift register may be removed.

The N-th second shift register SSR_N in accordance with embodiments of the present disclosure may include a second Q node controller 1113*a* configured to switch electrical connection between the Q node Q_N and the constant voltage line. The constant voltage line may include, for example, a line to which the base voltage VSS1 is applied. The second Q node controller 1113*a* may include one or more transistors T2A. The second Q node controller 1113*a* may be controlled by a carry signal CR_N+4 inputted from the subsequent second shift register.

Depending on the design, the carry signal inputted from the subsequent second shift register may be a carry signal CR_N+4 inputted from an N+4-th second shift register, a carry signal CR_N+3 inputted from an N+3-th second shift register, a carry signal CR_N+5 inputted from an N+5-th second shift register, or the like.

The N-th second shift register SSR_N in accordance with embodiments of the present disclosure may include a carry signal controller 1114*a* configured to switch electrical connection between the second pin PIN2 and the fourth pin PIN4. The carry signal controller 1114*a* may include one or more transistors T12A. The carry signal controller 1114*a* may be controlled depending on the voltage of the Q node Q_N. When a turn-on level voltage is applied to the Q node Q_N, the carry clock signal CR_CKx inputted to the second pin PIN2 may be outputted through the fourth pin PIN4.

The N-th second shift register SSR_N in accordance with embodiments of the present disclosure may include a scan signal controller 1115*a* configured to switch electrical connection between the first pin PIN1 and the third pin PIN3. The scan signal controller 1115*a* may include one or more transistors T9A. The scan signal controller 1115*a* may be controlled depending on the voltage of the Q node Q_N. When a turn-on level voltage is applied to the Q node Q_N, the second scan clock signal S2_CKx inputted to the first pin PIN1 may be outputted through the third pin PIN3. The turn-on level voltage of the scan signal controller 1115*a* may be the same as the turn-on level voltage of the carry signal controller 1114*a*.

The N-th second shift register SSR_N may further include one or more pins configured to receive voltages SFI1, STR, SRS, SGH, VSS2, VSS3, and the like.

The N+1-th second shift register SSR_N+1 may have a structure similar (or substantially identical) to that of the N-th second shift register SSR_N. The N+1-th second shift register SSR_N+1 may include a first pin PIN1, a second pin PIN2, a third pin PIN3, a fourth pin PIN4, a Q node Q_N+1, a first Q node controller 1112*b*, a global resetter 1111*b*, a second Q node controller 1113*b*, a carry signal controller 1114*b*, a second signal controller 1115*b*, and the like.

When a second reset signal RST is inputted, the transistor T1A and T1B of the global resetter 1111*a* and 1111*b* may be turned on, and the voltages of the Q nodes Q_N and Q_N+1 may be reset to the base voltage VSS1.

Figure 12:
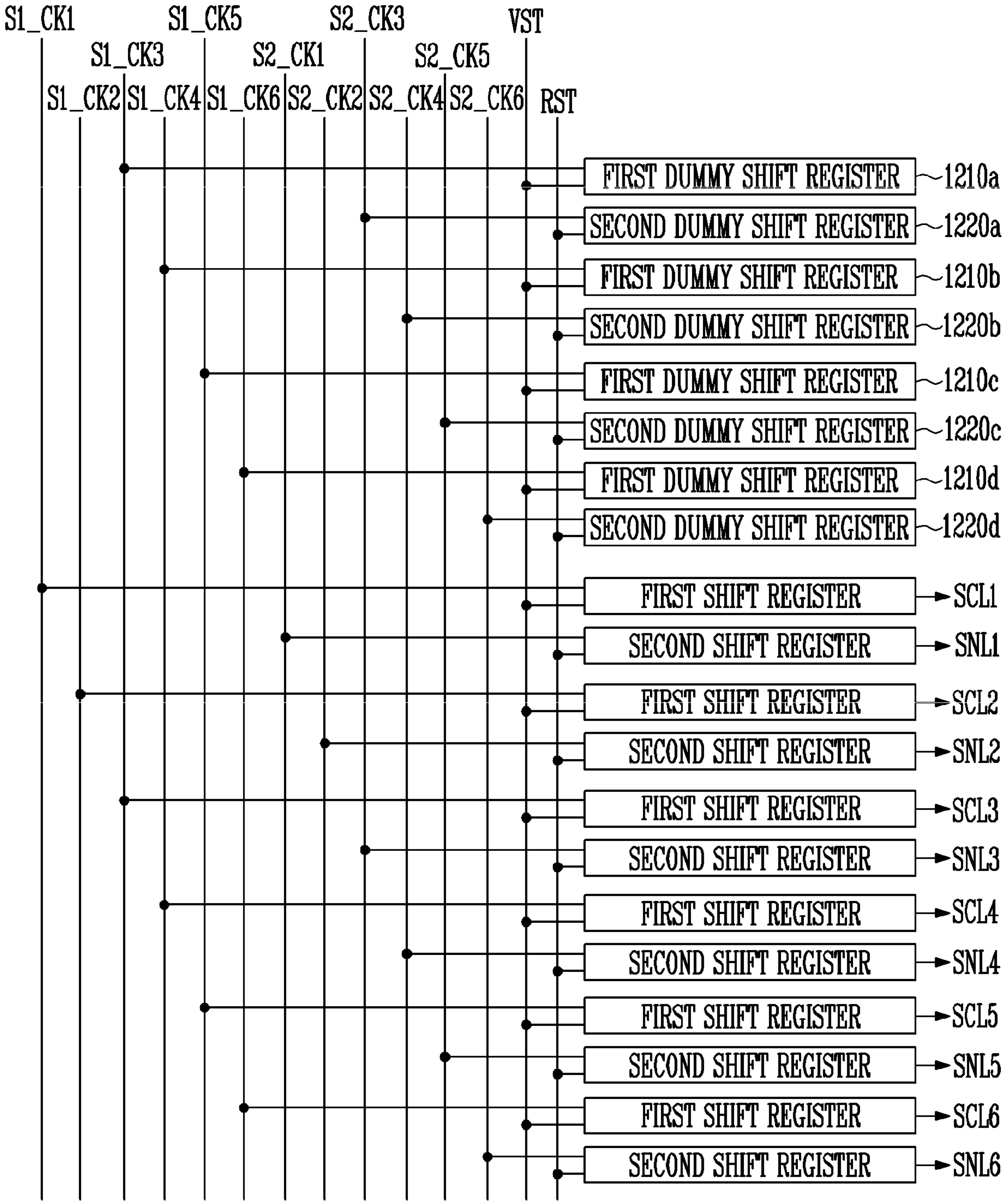
FIG. 12 is a diagram illustrating a plurality of scan clock signal lines disposed in a display device, and shift registers electrically connected to the scan clock signal lines, in accordance with embodiments of the present disclosure.

FIG. 12 is a diagram illustrating a plurality of scan clock signal lines disposed in the display device, and shift registers electrically connected to the scan clock signal lines in accordance with embodiments of the present disclosure.

Referring to FIG. 12, a plurality of scan clock signal lines may be disposed in the display device in accordance with embodiments of the present disclosure. Scan clock signals (e.g., first scan clock signals S1_CK1 to S1_CK6, second scan clock signals S2_CK1 to S2_CK6, and the like) may be applied to the plurality of scan clock signal lines.

Referring to FIG. 12, each of the plurality of shift registers (e.g., first shift registers, second shift registers, and the like) may be electrically connected to at least one scan clock signal line.

For example, the first shift register may be configured to receive any one of the plurality of first scan clock signals S1_CK1 to S1_CK6. For example, the second shift register may be configured to receive any one of the plurality of second scan clock signals S2_CK1 to S2_CK6. The first scan clock signals S1_CK1 to S1_CK6 correspond to the first scan clock signal S1_CKx described above with reference to FIG. 10. The second scan clock signals S2_CK1 to S2_CK6 correspond to the second scan clock signal S2_CKx described above with reference to FIG. 11.

Referring to FIG. 12, the number of first scan clock signals is illustrated as being six (e.g., S1_CK1, S1_CK2, S1_CK3, S1_CK4, S1_CK5, and S1_CK6), but depending on the design, the number of first scan clock signals may be less than six or greater than six. The number of second scan clock signals is illustrated as being six (e.g., S2_CK1, S2_CK2, S2_CK3, S2_CK4, S2_CK5, and S2_CK6), but depending on the design, the number of second scan clock signals may be less than six or greater than six.

Referring to FIG. 12, embodiments of the present disclosure may include one or more dummy shift registers (e.g., first dummy shift registers 1210*a*, 1210*b*, 1210*c*, and 1210*d* or second dummy shift registers 1220*a*, 1220*b*, 1220*c*, and 1220*d*).

The scan driving circuit 120 (refer to FIG. 1) in accordance with embodiments of the present disclosure may include dummy shift registers (e.g., first dummy shift registers 1210*a*, 1210*b*, 1210*c*, and 1210*d* or second dummy shift registers 1220*a*, 1220*b*, 1220*c*, and 1220*d*).

The first scan driving circuit 810 (refer to FIG. 8) in accordance with embodiments of the present disclosure may include one or more first dummy shift registers 1210*a*, 1210*b*, 1210*c*, and 1210*d*.

The second scan driving circuit 820 (refer to FIG. 8) in accordance with embodiments of the present disclosure may include one or more second dummy shift registers 1220*a*, 1220*b*, 1220*c*, and 1220*d*.

As illustrated above in FIG. 10, the N-th first shift register FSR_N may receive a carry signal CR_N−3 outputted from a preceding shift register (e.g., an N−3-th first shift register). In the circuit structure illustrated in FIG. 10, the display device 100 (refer to FIG. 1) in accordance with embodiments of the present disclosure may include at least four first dummy shift registers 1210*a*, 1210*b*, 1210*c*, and 1210*d* which precede the 1st first shift register.

Likewise, as illustrated above in FIG. 11, the N-th second shift register SSR_N may receive a carry signal CR_N−3 outputted from a preceding second shift register (e.g., an N−3-th second shift register). In the circuit structure illustrated in FIG. 11, the display device 100 (refer to FIG. 1) in accordance with embodiments of the present disclosure may include at least four second dummy shift registers 1220*a*, 1220*b*, 1220*c*, and 1220*d* which precede the 1st second shift register.

Each of the first dummy shift registers 1210*a*, 1210*b*, 1210*c*, and 1210*d* may be configured of a circuit similar to that of the first shift register FSR_N or FSR_N+1 illustrated in FIG. 10. For example, each of the first dummy shift registers 1210*a*, 1210*b*, 1210*c*, and 1210*d* may include a first pin PIN1 configured to receive a first scan clock signal, a fourth pin PIN4 configured to output a carry signal, and a global resetter 1011. However, each of the first dummy shift registers 1210*a*, 1210*b*, 1210*c*, and 1210*d* may not include a third pin PIN3 configured to output a scan signal, a scan signal controller 1015, or the like.

Each of the second dummy shift registers 1220*a*, 1220*b*, 1220*c*, and 1220*d* may be configured of a circuit similar to that of the second shift register SSR_N or SSR_N+1 illustrated in FIG. 11. For example, each of the second dummy shift registers 1220*a*, 1220*b*, 1220*c*, and 1220*d* may include a first pin PIN1 configured to receive a second scan clock signal, a fourth pin PIN4 configured to output a carry signal, and a global resetter 1111. However, each of the second dummy shift 1220*a*, 1220*b*, 1220*c*, and 1220*d* may not include a third pin PIN3 configured to output a scan signal, a scan signal controller 1115, or the like.

Figure 13:
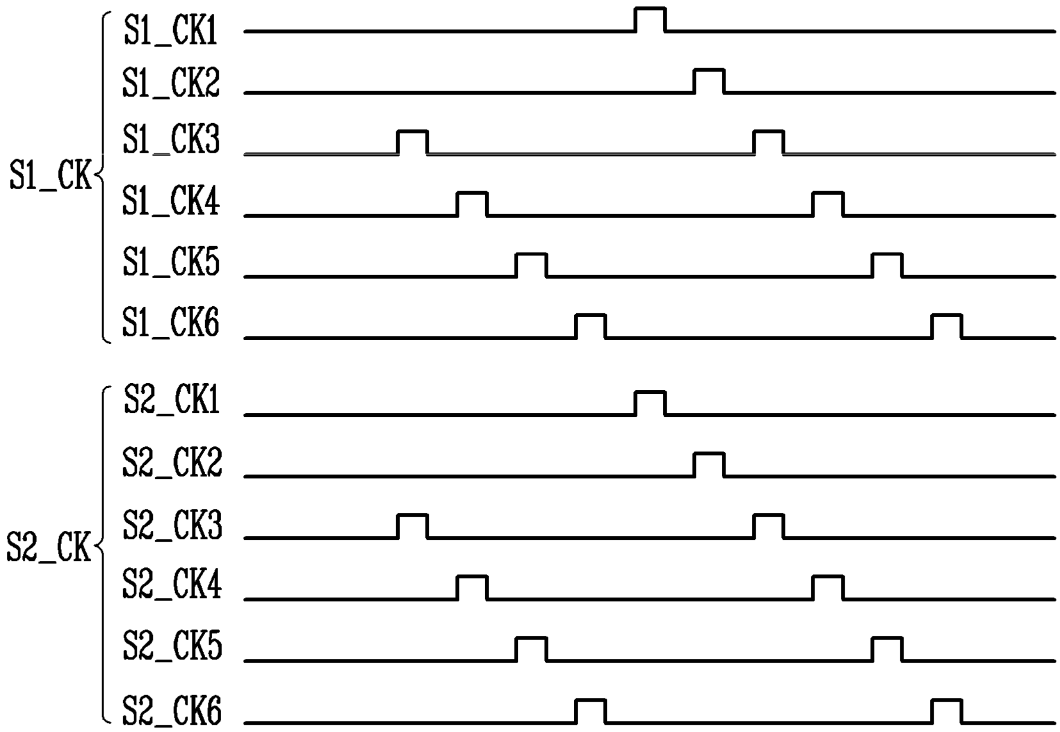
FIG. 13 is a timing diagram illustrating a plurality of first scan clock signals and a plurality of second scan clock signals in accordance with embodiments of the present disclosure.

FIG. 13 is a timing diagram illustrating a plurality of first scan clock signals S1_CK1, S1_CK2, S1_CK3, S1_CK4, S1_CK5, and S1_CK6 and a plurality of second scan clock signals S2_CK1, S2_CK2, S2_CK3, S2_CK4, S2_CK5, and S2_CK6 in accordance with embodiments of the present disclosure.

Referring to FIG. 13, the plurality of first scan clock signals S1_CK1, S1_CK2, S1_CK3, S1_CK4, S1_CK5, and S1_CK6 may be respectively sequentially applied to the first scan clock signal lines. The plurality of second scan clock signals S2_CK1, S2_CK2, S2_CK3, S2_CK4, S2_CK5, and S2_CK6 may be respectively sequentially applied to the second scan clock signal lines.

Referring to FIG. 13 along with FIG. 12 described above, to sequentially output scan signals to a plurality of scan lines (e.g., a plurality of first scan lines SCL1 to SCL6 and a plurality of second scan lines SNL1 to SNL6), a first reset signal VST may be inputted at a timing at which scan clock signals (e.g., the first scan clock signal S1_CK3 and the second scan clock signal S2_CK3) are inputted to the most preceding dummy shift registers 1210*a* and 1220*a*.

Accordingly, the plurality of first scan clock signals S1_CK1, S1_CK2, S1_CK3, S1_CK4, S1_CK5, and S1_CK6 may be sequentially applied to the first scan clock signal lines in a sequence from the 3rd first scan clock signal line (e.g., in a sequence of S1_CK3, S1_CK4, S1_CK5, S1_CK6, S1_CK1, and S1_CK2).

Likewise, the plurality of second scan clock signals S2_CK1, S2_CK2, S2_CK3, S2_CK4, S2_CK5, and S2_CK6 may be sequentially applied to the second scan clock signal lines in a sequence from the 3rd second scan clock signal line (e.g., in a sequence of S2_CK3, S2_CK4, S2_CK5, S2_CK6, S2_CK1, and S2_CK2).

Referring generally to FIGS. 1 to 13 described above, in embodiments of the present disclosure, if a frame transition is made during a blank period BLANK (in detail, an initialization period IP) of any one frame, a timing at which an active period ACTIVE of a subsequent frame starts may be limited.

In more detail, the timing at which the active period of the subsequent frame starts may be synchronized with a timing at which scan clock signals (e.g., S1_CK3 and S2_CK3) are inputted to the first dummy shift registers (e.g., 1210*a* and 1220*a*).

To achieve the foregoing purpose, the timing controller in accordance with embodiments of the present disclosure may include a masking block configured to output scan clock signals in a sequence from a preset scan clock signal (e.g., S2_CK3) when a frame transition is made. The masking block may function to remove at least a portion of a preceding signal (e.g., a second preceding signal S2). The masking block will be described below with reference to FIG. 14.

Figure 14:
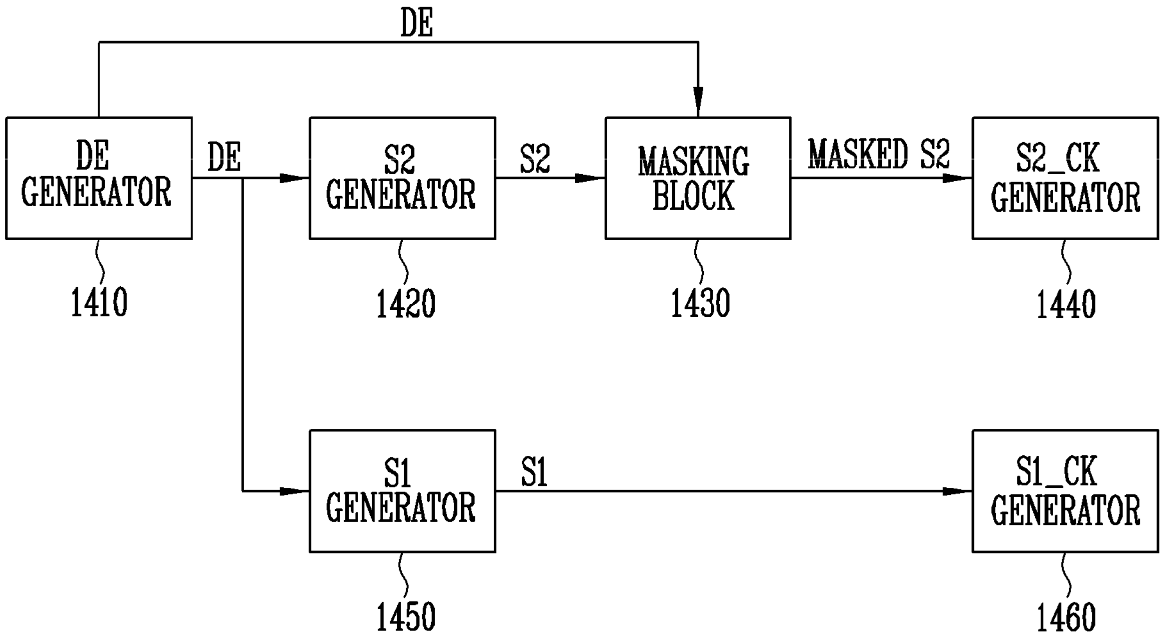
FIG. 14 is a block diagram illustrating a timing controller in accordance with embodiments of the present disclosure.

FIG. 14 is a block diagram of a timing controller 140 (refer to FIG. 1) in accordance with embodiments of the present disclosure.

The timing controller in accordance with embodiments of the present disclosure may include a data enable signal generator 1410, a second preceding signal generator 1420, a masking block 1430, a second scan clock signal generator 1440, and the like.

The data enable signal generator 1410 may generate a data enable signal DE based on image data inputted to the timing controller. For example, when image data of a subsequent frame (or a signal instructing a frame transition to be made) is inputted, the data enable signal generator 1410 may generate a data enable signal DE in response thereto. For example, if a subsequent frame starts, the data enable signal generator 1410 may generate a data enable signal DE which toggles.

The second preceding signal generator 1420 may receive a data enable signal DE or a signal substantially identical thereto (e.g., a signal having the same frequency as the data enable signal DE), and generate a second preceding signal S2 synchronized with the data enable signal DE. The second preceding signal S2 may include a signal having the same frequency as the data enable signal DE.

The masking block 1430 may receive the second preceding signal S2 and the data enable signal DE, and output a masked second preceding signal MASKED S2. If the data enable signal DE is inputted, the masking block 1430 may remove (e.g., mask) at least a portion of the second preceding signal S2.

For example, the masking block 1430 may count the number of pulses (or falling edges and/or rising edges) of the second preceding signal S2. The masking block 1430 may generate a second scan clock signal corresponding to a corresponding pulse based on the counted information. Based on the generated information, the masking block 1430 may remove (e.g., mask) at least a portion of the second preceding signal S2 such that when the data enable signal DE is inputted, clock signals can be outputted in a sequence from the preset second scan clock signal line. For example, the masking block 1430 may remove (e.g., mask) a portion of the second preceding signal S2 that corresponds to a time point at which the number of counted pulses becomes a multiple of a preset number, and may output a masked second preceding signal MASKED S2.

The second scan clock signal generator 1440 may generate a second scan clock signal based on the masked second preceding signal MASKED S2. The second scan clock signal generator 1440 may sequentially output generated second scan clock signals to a plurality of second scan clock signal lines.

Referring to FIG. 14, the timing controller in accordance with embodiments of the present disclosure may further include a first preceding signal generator 1450, a first scan clock signal generator 1460, and the like.

The first preceding signal generator 1450 may receive a data enable signal DE, and generate a first preceding signal S1 based on the received data enable signal DE.

The first scan clock signal generator 1460 may generate a first scan clock signal based on the inputted first preceding signal S1. The first scan clock signal generator 1460 may sequentially output generated first scan clock signals to a plurality of first scan clock signal lines.

Figure 15:
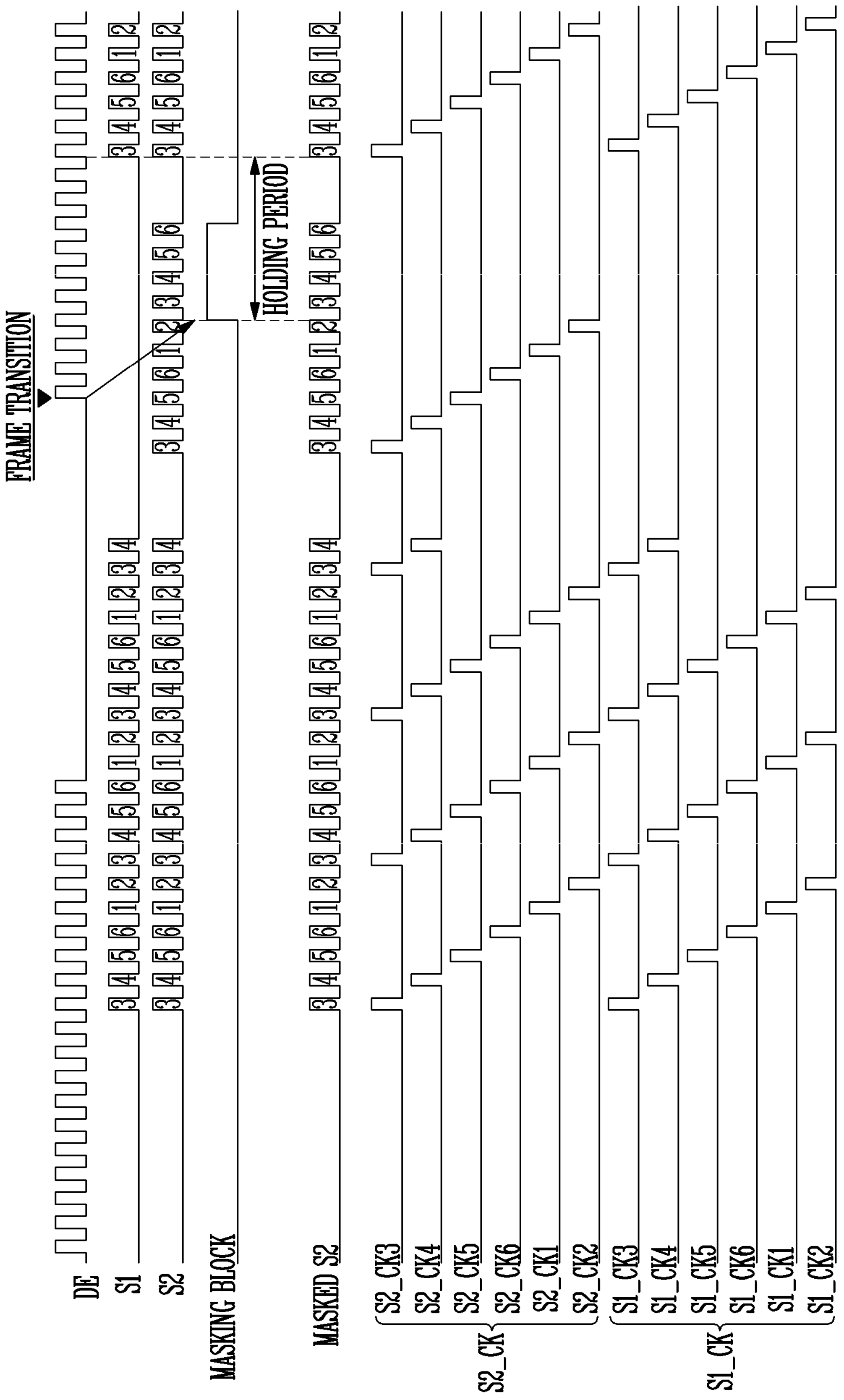
FIG. 15 is a timing diagram illustrating signals generated from the timing controller and signals outputted from the timing controller in accordance with embodiments of the present disclosure.

FIG. 15 is a timing diagram illustrating signals generated from the timing controller and signals outputted from the timing controller in accordance with embodiments of the present disclosure.

Referring to FIG. 15, in embodiments of the present disclosure, a plurality of first scan clock signals S1_CK may be generated by a first preceding signal S1. In embodiments of the present disclosure, a plurality of second scan clock signals S2_CK may be generated by a masked second preceding signal MASKED S2.

The masked second preceding signal MASKED S2 may be generated based on the number of pulses of the second preceding signal S2 and the data enable signal DE.

In embodiments of the present disclosure, any one frame period may include a holding period HOLDING PERIOD in which the second preceding signal S2 is generated but a plurality of second scan clock signals S2_CK are not outputted (e.g., a second scan clock signal having a turn-on level is not inputted to the second scan line).

After the holding period HOLDING PERIOD is terminated, a plurality first scan clock signals S1_CK and a plurality of second scan clock signals S2_CK may be sequentially outputted, so that an image of a subsequent frame can be displayed.

Figure 16:
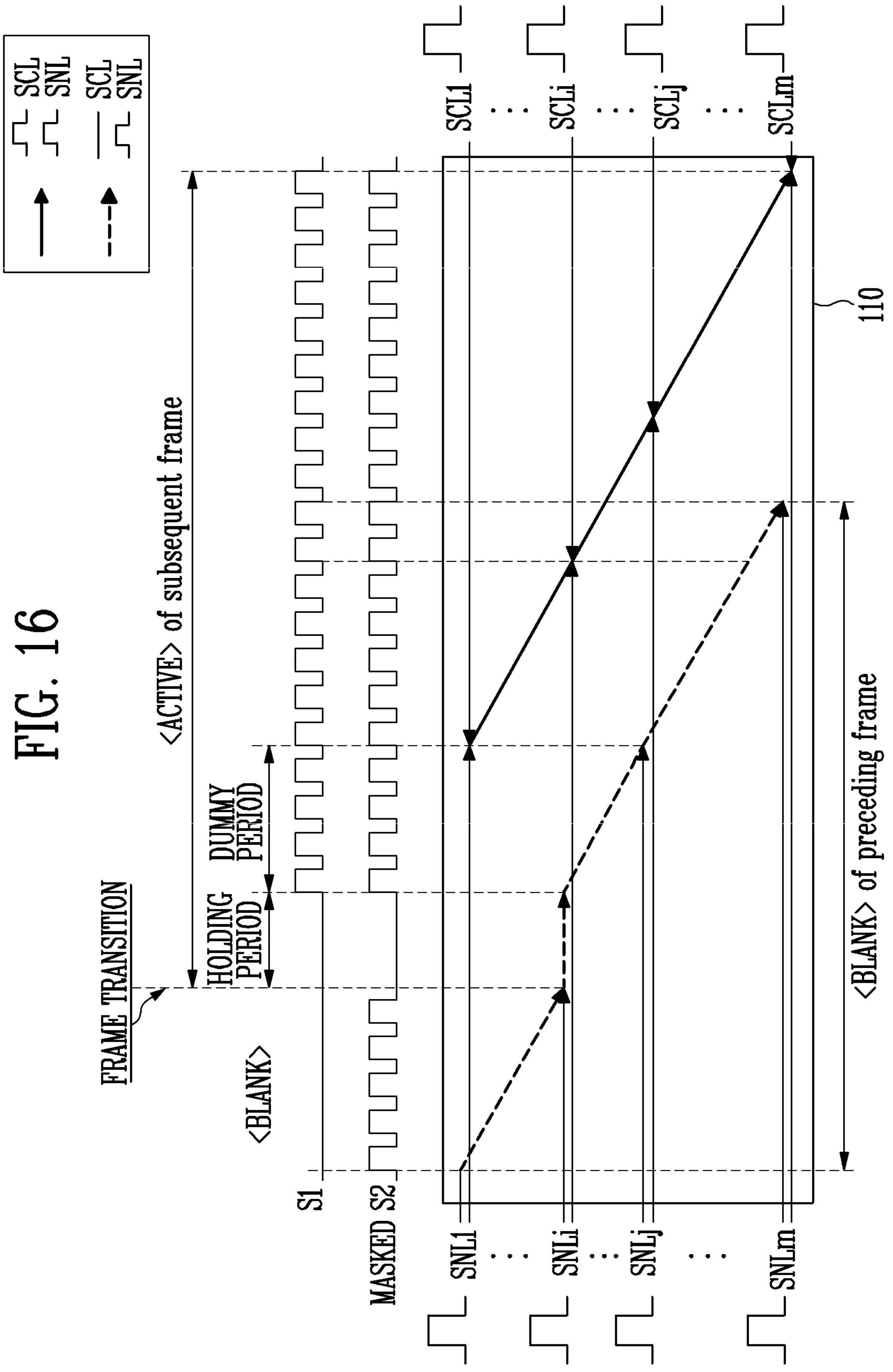
FIG. 16 is a diagram illustrating the case where an active period includes a holding period and a dummy period in accordance with embodiments of the present disclosure.

FIG. 16 is a diagram illustrating the case where an active period ACTIVE includes a holding period HOLDING PERIOD and a dummy period DUMMY PERIOD in embodiments of the present disclosure.

In FIG. 16, a dashed line indicates progress of a blank period BLANK (e.g., a blank period of a corresponding frame), and a solid line indicates progress of an active period ACTIVE (e.g., an active period of a subsequent frame).

Referring to FIG. 16, in embodiments of the present disclosure, a scan signal (e.g., a second scan signal) may be outputted to a plurality of second scan lines (e.g., SNL1 to SNLi) in the blank period BLANK.

Referring to FIG. 16, in embodiments of the present disclosure, a frame period may include a holding period HOLDING PERIOD. For example, the blank period BLANK of the corresponding frame period and an active period ACTIVE of a subsequent frame period each may include a holding period HOLDING PERIOD.

In the holding period HOLDING PERIOD, a plurality of first scan clock signals and a plurality of second scan clock signals may not be outputted. In other words, a voltage having a constant logic level (e.g., a turn-off logic level) may be applied to a plurality of first scan clock signal lines and a plurality of second scan clock signal lines.

Referring to FIG. 16, in embodiments of the present disclosure, a frame period may include a dummy period DUMMY PERIOD. For example, the blank period BLANK of the corresponding frame period and an active period ACTIVE of a subsequent frame period each may include a dummy period DUMMY PERIOD.

In the dummy period DUMMY PERIOD, a second scan signal may be outputted to one or more second scan lines SNLi to SNLj ($i \le j \le m$). In the dummy period DUMMY PERIOD, the first scan clock signals S1_CK3, S1_CK4, S1_CK5, and S1_CK6 may be inputted to the first dummy shift registers 1210*a*, 1210*b*, 1210*c*, and 1210*d* described with reference to FIG. 12, and second scan clock signals S2_CK3, S2_CK4, S2_CK5, and S2_CK6 may be inputted to the second dummy shift registers 1220*a*, 1220*b*, 1220*c*, and 1220*d*.

In the blank period BLANK including the holding period HOLDING PERIOD, and the dummy period DUMMY PERIOD, a scan signal (e.g., a first scan signal) may not be outputted to the plurality of first scan lines SCL1 to SCLm.

Referring to FIG. 16, in embodiments of the present disclosure, two successive frame periods may overlap each other. For example, the blank period of each corresponding frame period and the active period of a subsequent frame period may at least partially overlap each other.

Referring to FIG. 16, a scan signal (e.g., a second scan signal SENSE) may be outputted to two second scan lines that are not adjacent to each other among the plurality of second scan lines SNL1 to SNLm.

Consequently, the display device in accordance with embodiments of the present disclosure is improved in visibility so that images can be displayed at various refresh rates.

A display device in accordance with embodiments of the present disclosure is improved in visibility so that images can be displayed at various refresh rates.

Although the preferred embodiments of the present disclosure have been disclosed for illustrative purposes, those skilled in the art will appreciate that various modifications, additions and substitutions are possible, without departing from the scope and spirit of the present disclosure as disclosed in the accompanying claims. Accordingly, the bounds and scope of the present disclosure should be determined by the technical spirit of the following claims.

What is claimed is:

1. A display device comprising:

a display panel including a plurality of first scan lines, a plurality of second scan lines, and a plurality of pixels electrically connected to the plurality of first scan lines and the plurality of second scan lines and each including a scan transistor and a sense transistor;

a first scan driving circuit including a plurality of first shift registers each of which is configured to output a first scan signal to a corresponding first scan line connected to the scan transistor in a pixel and is configured to be reset by a first reset signal;

a second scan driving circuit including a plurality of second shift registers each of which is configured to output a second scan signal to a corresponding second scan line connected to the sense transistor in the pixel and is configured to be reset by a second reset signal; and a timing controller configured to output the first reset signal and the second reset signal through different signal lines, respectively, wherein each of the plurality of pixels includes a light emitting element, and wherein, a number of flickers of the light emitting element in a blank period is controlled depending on a cycle at which the data voltages are inputted to the plurality of pixels.

2. The display device according to claim 1, further comprising:

a plurality of data lines disposed on the display panel and receiving a plurality of data voltages, and a data driving circuit configured to supply the plurality of data voltages to the plurality of data lines, wherein the plurality of pixels are electrically connected to the plurality of data lines, wherein the plurality of data voltages are configured to be written to the plurality of pixels in an active period of one frame period, and wherein, in the active period, the each of the plurality of first shift registers outputs the first scan signal having a turn-on voltage level to the corresponding first scan line, and the each of the plurality of second shift registers outputs the second scan signal having a turn-on voltage level to the corresponding second scan line.

3. The display device according to claim 2, wherein, in the blank period that does not overlap the active period during the one frame period, the first scan driving circuit outputs the first scan signal having a turn-off voltage level to each of the plurality of first scan lines, and the second scan driving circuit outputs the second scan signal having the turn-on voltage level to each of the plurality of second scan lines.

4. The display device according to claim 3, wherein at least one of the plurality of pixels further comprises:

a driving transistor configured to supply driving current to the light emitting element, wherein the scan transistor is configured to switch electrical connection between the driving transistor and any one data line of the plurality of data lines; and wherein the sense transistor is configured to switch electrical connection between the light emitting element and a reference voltage line.

5. The display device according to claim 3, wherein the blank period comprises:

an initialization period in which the second scan signal having the turn-on voltage level is supplied to the second scan line electrically connected to at least one of the plurality of pixels; and an emission period in which the second scan signal having a turn-off voltage level is inputted to the second scan line electrically connected to at least one of the plurality of pixels.

6. The display device according to claim 3, wherein the timing controller outputs a first scan clock signal and a second scan clock signal, wherein the first scan driving circuit outputs the first scan signal to the corresponding first scan line in synchronization with the first scan clock signal, wherein the second scan driving circuit outputs the second scan signal to the corresponding second scan line in synchronization with the second scan clock signal, and wherein, in at least a partial period of the blank period, the first scan clock signal has a voltage of a turn-off logic level and the second scan clock signal toggles between a voltage of a turn-on logic level and a voltage of a turn-off logic level.

7. The display device according to claim 6, wherein the blank period includes a holding period, and wherein the timing controller outputs, when image data of a subsequent frame is received during the blank period, the first scan clock signal of the turn-off logic level and the second scan clock signal of the turn-off logic level during the holding period.

8. The display device according to claim 7, wherein the timing controller outputs, when the image data of the subsequent frame is received during the blank period, the first reset signal of a turn-on logic level and the second reset signal of a turn-off logic level.

9. The display device according to claim 7, wherein the second scan driving circuit suspends the output of the second scan signal during the holding period.

10. The display device according to claim 7, wherein, in a dummy period after the holding period, the timing controller outputs the first scan clock signal of a turn-on logic level and the turn-off logic level, and outputs the second scan clock signal of the turn-on logic level and the turn-off logic level.

11. The display device according to claim 10, wherein, in the dummy period, the second scan driving circuit resumes the output of the second scan signal.

12. The display device according to claim 3, wherein, during at least partial period of the blank period, when image data for displaying an image of a subsequent frame is inputted to the timing controller, the blank period of the one frame period and an active period of the subsequent frame at least partially overlap each other.

13. A display device comprising:

a display panel including a plurality of first scan lines, a plurality of second scan lines, and a plurality of pixels electrically connected to the plurality of first scan lines and the plurality of second scan lines;

a first scan driving circuit including a plurality of first shift registers each of which is configured to output a first scan signal to a corresponding first scan line and is configured to be reset by a first reset signal;

a second scan driving circuit including a plurality of second shift registers each of which is configured to output a second scan signal to a corresponding second scan line and is configured to be reset by a second reset signal; and a timing controller configured to output the first reset signal and the second reset signal through different signal lines, respectively, wherein at least one of the plurality of first shift registers comprises a Q node configured to store a carry signal inputted from any one preceding first shift register among the plurality of first shift registers, and wherein, when the first reset signal is inputted, a voltage of the Q node is reduced to a base voltage.

14. The display device according to claim 13, wherein the at least one of the plurality of first shift registers further comprises:

a reset signal input pin configured to receive the first reset signal;

a first pin configured to receive a first scan clock signal;

a second pin configured to receive a carry clock signal;

a third pin configured to output the first scan signal;

a fourth pin configured to output a carry signal;

a scan signal controller configured to switch electrical connection between the first pin and the third pin in response to the voltage of the Q node;

a carry signal controller configured to switch electrical connection between the second pin and the fourth pin in response to the voltage of the Q node; and a global resetter configured to switch electrical connection between the Q node and a power line to which a constant voltage is applied in response to the first reset signal.

15. The display device according to claim 1, wherein any one of the plurality of second shift registers comprises a first pin configured to receive the first reset signal and a second pin configured to receive the second reset signal.

16. The display device according to claim 15, wherein the any one of the plurality of second shift registers is a dummy shift register configured not to output the second scan signal.

17. A display device comprising:

a display panel including a plurality of first scan lines, a plurality of second scan lines, and a plurality of pixels electrically connected to the plurality of first scan lines and the plurality of second scan lines;

a first scan driving circuit including a plurality of first shift registers each of which is configured to output a first scan signal to a corresponding first scan line and is configured to be reset by a first reset signal;

a second scan driving circuit including a plurality of second shift registers each of which is configured to output a second scan signal to a corresponding second scan line and is configured to be reset by a second reset signal; and a timing controller configured to respectively output the first reset signal and the second reset signal through different signal lines, wherein the timing controller comprises:

a data enable signal generator configured to generate a data enable signal;

a preceding signal generator configured to generate a preceding signal corresponding to a frequency of the data enable signal; and a scan clock signal generator configured to generate a scan clock signal based on the preceding signal outputted from the preceding signal generator, and wherein the timing controller outputs the first reset signal synchronized with the preceding signal and outputs the second reset signal at a timing different from a timing at which the first reset signal is outputted.

18. The display device according to claim 17, wherein the preceding signal generator generates the preceding signal having a constant logic level at a timing at which the second reset signal is outputted.

19. The display device according to claim 17, wherein the timing controller further comprises a masking block configured to remove at least a portion of the preceding signal based on the data enable signal, and wherein the masking block counts a number of pulses included in the preceding signal, masks the at least a portion of the preceding signal based on the counted number of pulses, and outputs a masked preceding signal.

* * * * *